United States Patent
Akimoto et al.

(10) Patent No.: US 8,494,746 B2
(45) Date of Patent: Jul. 23, 2013

(54) INVERTED PENDULUM TYPE VEHICLE

(75) Inventors: Kazushi Akimoto, Saitama (JP); Hideo Murakami, Saitama (JP); Toru Takenaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 8 days.

(21) Appl. No.: 13/395,560

(22) PCT Filed: Sep. 23, 2009

(86) PCT No.: PCT/JP2009/004787
§ 371 (c)(1),
(2), (4) Date: Mar. 12, 2012

(87) PCT Pub. No.: WO2011/036696
PCT Pub. Date: Mar. 31, 2011

(65) Prior Publication Data
US 2012/0173109 A1 Jul. 5, 2012

(51) Int. Cl.
*G05D 1/00* (2006.01)
(52) U.S. Cl.
USPC .............................. 701/70; 180/21

(58) Field of Classification Search
USPC ............. 701/70, 99, 49, 48, 1, 93, 22; 180/21
See application file for complete search history.

(56) References Cited

U.S. PATENT DOCUMENTS

| 7,945,367 B2 * | 5/2011 | Kosaka | 701/70 |
| 2009/0018743 A1 * | 1/2009 | Yamada | 701/74 |

FOREIGN PATENT DOCUMENTS

| JP | 4-201793 A | 7/1992 |
| JP | 2004-129435 A | 4/2004 |
| JP | 2006-282160 A | 10/2006 |
| JP | 2007-160956 A | 6/2007 |
| JP | 2009083754 * | 4/2009 |
| WO | 2008/132778 A1 | 11/2008 |
| WO | 2008/132779 A1 | 11/2008 |
| WO | 2008/139740 A1 | 11/2008 |

* cited by examiner

Primary Examiner — Marthe Marc-Coleman
(74) Attorney, Agent, or Firm — Carrier Blackman & Associates, P.C.; Joseph P. Carrier; William D. Blackman

(57) ABSTRACT

A desired travelling velocity of a representative point of a vehicle 1 is set under such a condition that it does not exceed a velocity permissible range which is defined to have anisotropy according to a posture of an occupant seated on a seat 3. An operation of a travelling motion unit 5 is controlled by controlling an operation of an actuator 7 on the basis of the desired travelling velocity.

12 Claims, 13 Drawing Sheets

INVERTED PENDULUM TYPE VEHICLE

TECHNICAL FIELD

The present invention relates to a control device of an inverted pendulum type vehicle capable of moving on a floor surface.

BACKGROUND ART

There has been proposed an inverted pendulum type vehicle which has a base body assembled with a travelling motion unit capable of travelling on a floor surface, an actuator which drives the travelling motion unit and a loading part which is freely tiltable with respect to the perpendicular direction and is used for transporting an object. For example, the present applicant proposes vehicles capable of functioning as the inverted pendulum type vehicle (Refer to Published PCT International Application WO/2008/132778 (Patent Document 2) and Published PCT International Application WO/2008/132779 (Patent Document 3)). In order to maintain a tilt angle of the loading part at a desired tilt angle (to prevent the loading part from tilting and falling down), it is necessary to move the travelling motion unit by displacing a fulcrum of the inverted pendulum in the inverted pendulum.

Therefore, a control technology of the inverted pendulum type vehicle had been proposed by the present applicant (Refer to U.S. Pat. No. 3,070,015 (Patent Document 1).

Specifically, the control subject is an inverted pendulum type vehicle in which a base body thereof assembled with a payload supporting part for transporting an occupant serving as the loading part for transporting an object is provided in such a way that it is freely tiltable about two axes, specifically one axis in a longitudinal direction and the other axis in a lateral direction, with respect to the travelling motion unit having a ball shape. A driving torque of a motor is sequentially determined so as to approximate a difference between a measured value of a tilt angle of the base body (=tilt angle of the payload supporting part) and a desired tilt angle and a difference between a measured value of a velocity of the motor as an actuator (and consequently a travelling velocity of the travelling motion unit) and a desired velocity to 0. Thereafter, the travelling motion of the travelling motion unit is controlled via the motor according to the determined drive torque.

SUMMARY OF THE INVENTION

Problems to be Solved by the Invention

However, since the desired travelling velocity of the vehicle is only restricted according to the limits of the rotational angular velocities of the actuator, it is possible that the vehicle is moving at a velocity applying an uncomfortable feeling to the occupant according to the travelling direction of the vehicle.

The present invention has been accomplished in view of the aforementioned problems, and it is therefore an object of the present invention to provide an inverted pendulum type vehicle cable of moving in an appropriate manner in view of a riding quality of an occupant.

Means for Solving the Problems

To attain an object described above, a first embodiment of the present invention provides an inverted pendulum type vehicle comprising: a traveling motion unit capable of moving on a floor surface in all directions including a first direction and a second direction which are orthogonal to each other, an actuator for driving the traveling motion unit, a base body assembled with the traveling motion unit and the actuator, and a controller configured to control the actuator, wherein the controller is provided with a representative point velocity restrictor for restricting a travelling velocity of a predefined representative point of the vehicle according to a velocity permissible range and is configured to vary a velocity permissible range of a travelling velocity of the representative point in the second direction according to a travelling velocity of the representative point in the first direction (First aspect).

According to the inverted pendulum type vehicle as the first embodiment of the present invention, the motion of the vehicle is controlled according to velocity anisotropy, namely the maximum travelling velocities are different in different travelling directions. The velocity anisotropy may be set to fit riding quality anisotropy which means that the riding quality sensed by the occupant boarding the vehicle is different in different translational directions even though the translational velocities are identical.

Thus, in a direction where it is easy for the occupant to have an uncomfortable feeling when the translational velocity becomes higher, the vehicle is prevented from moving in a situation where the excessively high travelling velocity or the like of the vehicle may deteriorate the riding quality of the occupant in a high possibility. Consequently, the vehicle can move in an appropriate mode in view of the riding quality of the occupant.

In the inverted pendulum type vehicle of the first aspect of the present invention, it is acceptable that the first direction is a fore-and-aft direction of the vehicle and the second direction is a lateral direction of the vehicle (Second aspect).

In the inverted pendulum type vehicle of the first aspect of the present invention, it is acceptable that in an occupant velocity coordinate system where travelling velocity components toward a front side and a back side of the occupant, respectively, are represented by a positive coordinate value and a negative coordinate value of a first occupant velocity coordinate axis, respectively, and travelling velocity components toward a left direction and a right direction of the occupant are represented by a positive coordinate value and a negative coordinate value of a second occupant velocity coordinate axis, respectively, the velocity permissible range is defined in such a way that the maximum absolute value of positive coordinates in the first occupant velocity coordinate axis is greater than the maximum absolute value of negative coordinates in the first occupant velocity coordinate axis (Third aspect).

According to the inverted pendulum type vehicle having the mentioned configuration, at the time when the occupant is boarding the payload supporting part, the maximum velocity component toward the same direction as the back side of the occupant is restricted lower than the maximum velocity component toward the same direction as the front side of the occupant. According thereto, in consideration of the fact that compared with the translation toward the front side, the translation toward the back side will make it more difficult for the occupant to cast the visual field on the translational direction toward the back side or easier for the occupant to have an uncomfortable feeling even though the translational velocities are identical, the motion of the vehicle can be controlled in an appropriate manner without deteriorating the riding quality of the occupant.

In the inverted pendulum type vehicle of the third aspect of the present invention, it is acceptable that the velocity permissible range is defined in such a way that a width thereof in the direction parallel to the second occupant velocity coordinate axis decreases continuously or discontinuously in a region of at least a part of coordinate values in the first occupant velocity coordinate axis as the absolute values of the coordinate values in the first velocity coordinate axis increase (Fourth aspect).

According to the inverted pendulum type vehicle having the mentioned configuration, the vehicle may move in such a manner that the maximum velocity component of the vehicle relative to the lateral direction of the occupant decreases as the travelling velocity component of the vehicle relative to the front side or the back side of the occupant increases. According thereto, when a velocity component of the vehicle has changed in the fore-and-aft direction of the occupant, the velocity of the vehicle can be prevented from varying remarkably.

Thereby, the vehicle can be prevented from moving in a manner to deteriorate the riding quality of the occupant. Moreover, since the variation amount on the velocity components of the vehicle to the lateral direction of the occupant is restricted smaller in a situation where the velocity components of the vehicle in the fore-and-aft direction of the occupant are relatively high, it is possible to maintain the travelling stability of the vehicle.

In the inverted pendulum type vehicle of the third aspect of the present invention, it is acceptable that the velocity permissible range is defined to have a combined shape of a trapezoid in the positive side of the velocity coordinate system which has a lower bottom side overlapping with the second occupant velocity coordinate axis and a position of an upper bottom side represented by the positive coordinates of the first occupant velocity coordinate axis, and a trapezoid in the negative side of the velocity coordinate system which has a lower bottom side in common with of the trapezoid in the positive side and a position of an upper bottom side represented by the negative coordinates of the first occupant velocity coordinate axis (Fifth aspect).

According to the inverted pendulum type vehicle having the mentioned configuration, the vehicle may move in such a manner that the maximum velocity component relative to the lateral direction of the occupant decreases as the travelling velocity component of the vehicle relative to the front side or the back side of the occupant increases. According thereto, when the vehicle accelerates or decelerates in the fore-and-aft direction of the occupant, since the translational velocity of the vehicle can be prevented from varying remarkably, the vehicle can be prevented from moving in a manner to deteriorate the riding quality of the occupant.

In the inverted pendulum type vehicle of the second aspect of the present invention, it is acceptable that the velocity permissible range is defined in such a way that in a region greater than a predefined value in the first occupant velocity coordinate axis a width of the velocity permissible range in the direction parallel to the second occupant velocity coordinate axis is a fixed value or decreases continuously or discontinuously as the absolute values of coordinate values in the first velocity coordinate axis increase, and meanwhile in a region smaller than the predefined value but greater than zero in the first occupant velocity coordinate axis a width thereof in the direction parallel to the second occupant velocity coordinate axis is greater than the width at the predefined value in the first occupant velocity coordinate axis (Sixth aspect).

According to the inverted pendulum type vehicle having the mentioned configuration, since the variation amount on the velocity components of the vehicle to the lateral direction of the occupant is restricted smaller in a situation where the velocity component of the vehicle to the front side of the occupant is greater than the predefined value, it is possible to maintain the stability of the vehicle travelling straight.

In the inverted pendulum type vehicle of the first aspect of the present invention, it is acceptable that in an occupant velocity coordinate system where velocity components of the vehicle toward a front side and a back side of the occupant, respectively, are represented by a positive coordinate value and a negative coordinate value of a first occupant velocity coordinate axis, respectively, and velocity components of the vehicle toward a left direction and a right direction of the occupant are represented by a positive coordinate value and a negative coordinate value of a second occupant velocity coordinate axis, respectively, the velocity permissible range is defined to be symmetry about the first occupant velocity coordinate axis (Seventh aspect).

According to the inverted pendulum type vehicle having the mentioned configuration, since the maximum velocity component toward either one side in the lateral direction of the occupant is different from the maximum velocity component toward the other side, it is possible to prevent the riding quality from being deteriorated.

In the inverted pendulum type vehicle of the third aspect of the present invention, it is acceptable that the velocity permissible range is defined to be symmetry about the first occupant velocity coordinate axis (Eighth aspect).

According to the inverted pendulum type vehicle having the mentioned configuration, since the maximum velocity component toward either one side in the lateral direction of the occupant is different from the maximum velocity component toward the other side, it is possible to prevent the riding quality from being deteriorated.

In the inverted pendulum type vehicle of the first aspect of the present invention, it is acceptable that the controller is further provided with a detector for detecting a tilt of the base body, the representative point is a predefined point located above a ground contact point, and the travelling velocity of the representative point is a velocity determined according to a velocity of the travelling motion unit and a detected tilt of the base body (Ninth aspect).

According to the inverted pendulum type vehicle having the mentioned configuration, it is possible to restrict the travelling velocity of the vehicle with the tilt stability of the base body maintained by restricting not only the travelling velocity of the travelling motion unit, namely restricting the travelling velocity of the vehicle in a situation where the tilt stability of the base body degrades in a high possibility, but also the representative point velocity.

In the inverted pendulum type vehicle of the first aspect of the present invention, it is acceptable that the representative point velocity restrictor is provided with the velocity permissible range for the traveling velocity of the representative point and is configured to control the actuator to approximate an excess amount to zero if the traveling velocity of the representative point velocity exceeds the velocity permissible range (Tenth aspect).

According to the inverted pendulum type vehicle having the mentioned configuration, when the representative point velocity deviates beyond the permissible range thereof, by controlling the operation of the actuator to approximate the representative point velocity to a boundary value of the permissible range, it is possible to restrict the travelling velocity of the travelling motion unit with the tilt stability of the base body maintained.

To attain an object described above, a second embodiment of the present invention provides an inverted pendulum type vehicle comprising: a traveling motion unit capable of moving on a floor surface in all directions including a first direction and a second direction which are orthogonal to each other, an actuator for driving the traveling motion unit, a base body assembled with the traveling motion unit and the actuator, a payload supporting part for boarding an occupant assembled to the base body, and a controller configured to control the actuator, wherein the controller controls the actuator to decrease a travelling velocity of a representative point in the second direction generated when the occupant moves a center of gravity thereof toward the second direction, as the absolute value of a travelling velocity of the representative point in the first direction increases (Eleventh aspect).

According to the inverted pendulum type vehicle as the second embodiment of the present invention, if the absolute value of a travelling velocity of the representative point in the first direction increases, the operation of the actuator is controlled so as to decrease the travelling velocity of the representative point in the second direction generated when the occupant moves the center of gravity thereof toward the second direction. According thereto, when the representative point of the vehicle is moving in the first direction, the deviation of the representative point of the vehicle with respect the second direction caused by the deviation of the center of gravity of the occupant toward the second direction is restrained, and consequently, the travelling stability of the vehicle may be maintained.

To attain an object described above, a third embodiment of the present invention provides an inverted pendulum type vehicle comprising: a traveling motion unit capable of moving on a floor surface in all directions including a first direction and a second direction which are orthogonal to each other, an actuator for driving the traveling motion unit, a base body assembled with the traveling motion unit and the actuator, and a controller configured to control the actuator, wherein the controller controls the actuator to increase a ratio of a change in either a velocity or an acceleration of the travelling motion unit in the second direction with respect to a change in the travelling velocity of the representative point in the second direction as the absolute value of the travelling velocity of the representative point in the first direction increases (Twelfth aspect).

According to the inverted pendulum type vehicle as the third embodiment of the present invention, if the absolute value of the travelling velocity of the representative point in the first direction increases, the operation of the actuator is controlled so as to increase a ratio of a change in either a velocity or an acceleration of the travelling motion unit in the second direction with respect to a change in the travelling velocity of the representative point in the second direction. According thereto, when the representative point of the vehicle is moving in the first direction, the deviation of the representative point of the vehicle with respect the second direction is restrained, and consequently, the travelling stability of the vehicle may be maintained.

MODE FOR CARRYING OUT THE INVENTION

An embodiment of the present invention will be described hereinafter.

(Basic Configuration of the Vehicle)

First, the structure of an inverted pendulum type vehicle in the present embodiment will be described with reference to FIG. 1 to FIG. 6.

Figure 1:
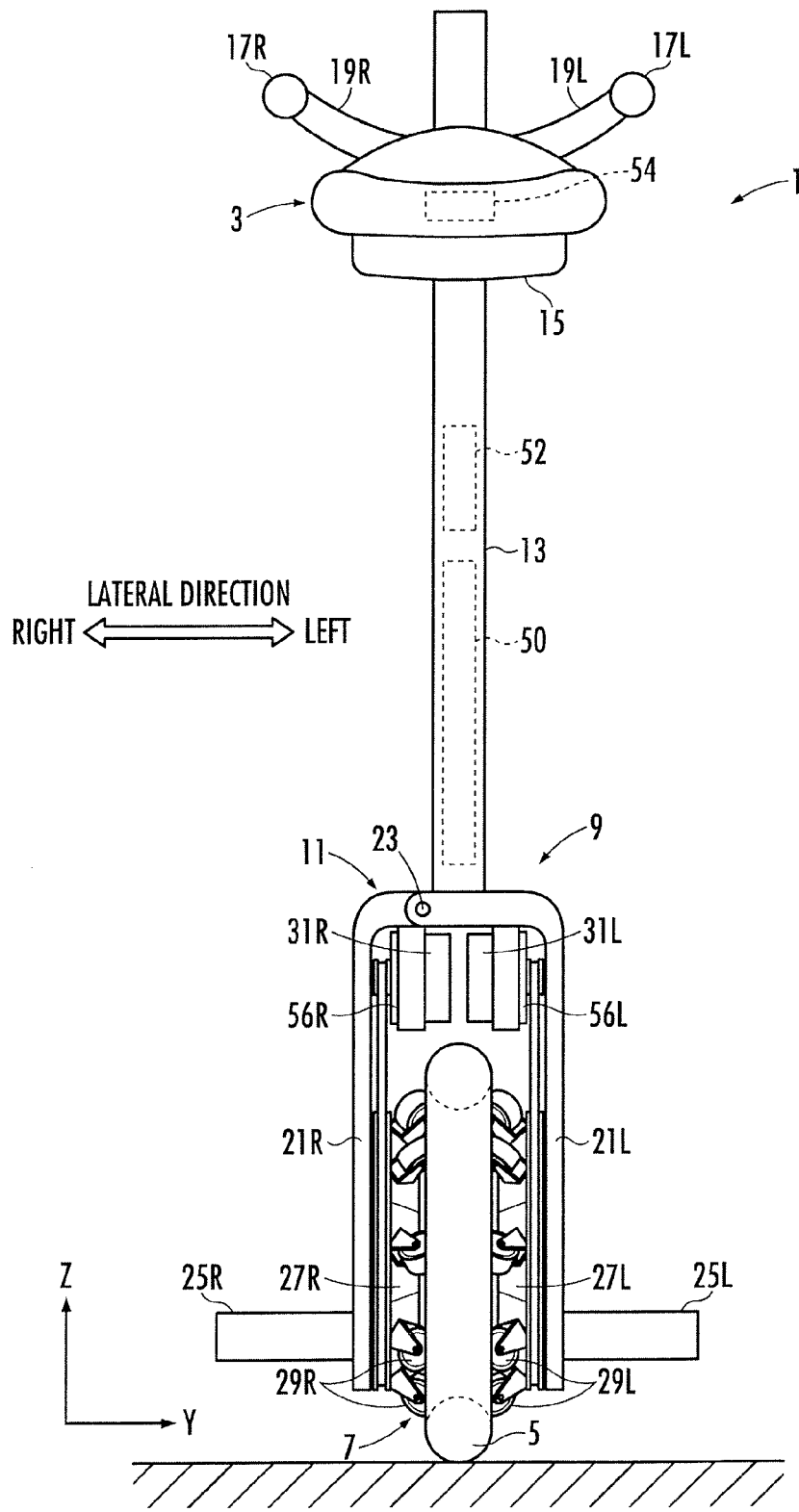
FIG. 1 is a front diagram of an inverted pendulum type vehicle according to an embodiment.
Figure 2:
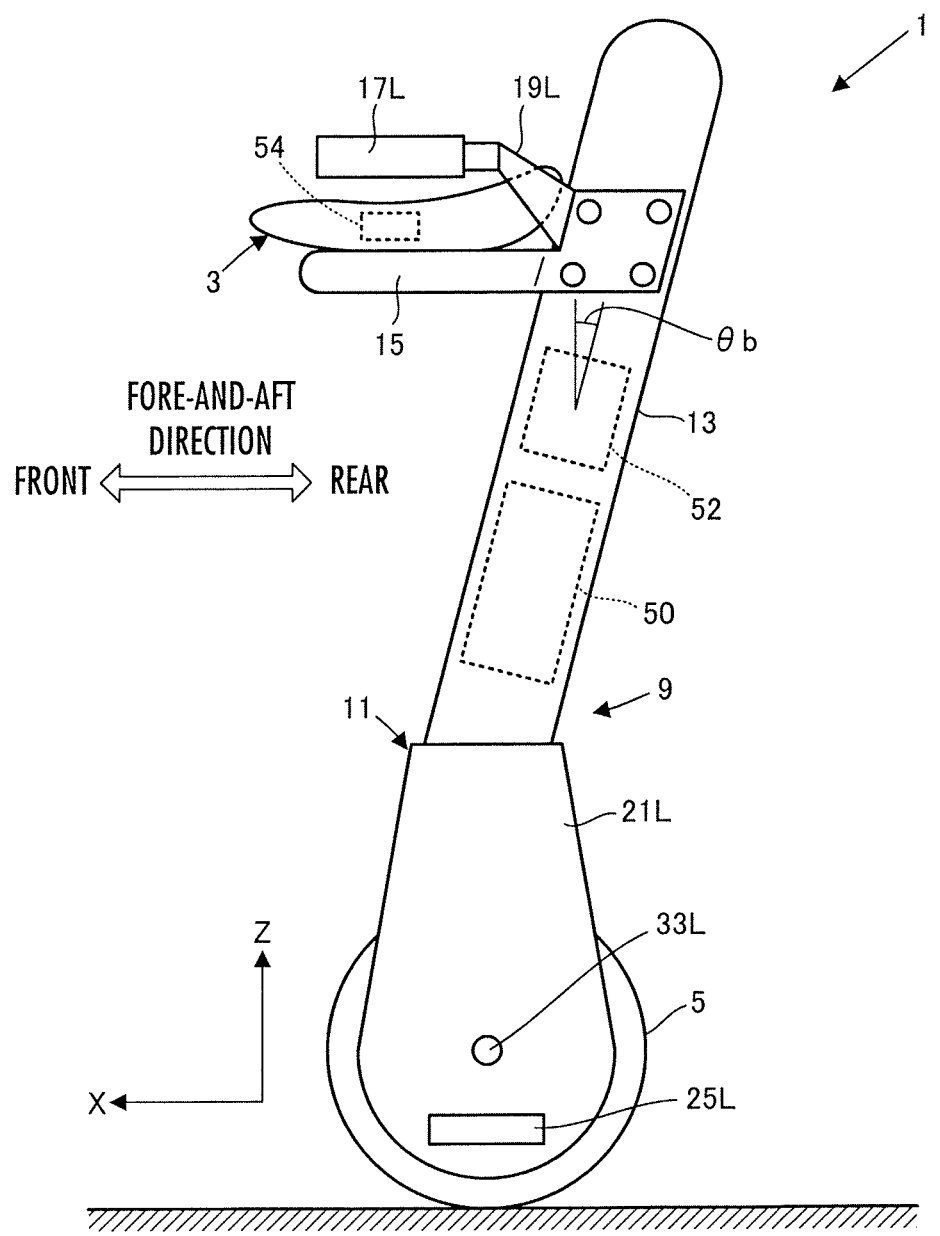
FIG. 2 is a side view of the inverted pendulum type vehicle according to the embodiment.

As illustrated in FIG. 1 and FIG. 2, an inverted pendulum type vehicle 1 in the present embodiment includes a payload supporting part 3 for an occupant (driver), a traveling motion unit 5 capable of traveling in all directions (all directions in 2 dimensions, including a fore-and-aft direction and a lateral direction) on a floor surface while being in contact with a floor surface, an actuator 7 which imparts to the traveling motion unit 5 a motive power for driving the traveling motion unit 5, and a base body 9 on which the payload supporting part 3, the traveling motion unit 5, and the actuator 7 are mounted.

Here, in the description of the present embodiment, "the fore-and-aft direction" and "the lateral direction" mean the directions that coincide or substantially coincide with the fore-and-aft direction and the lateral direction, respectively, of the upper body of an occupant aboard the payload supporting part 3 in a normal posture. "the normal posture" is a posture envisaged in the design related to the payload supporting part 3, and it is a posture in which the trunk axis of the upper body of the occupant is oriented approximately in the vertical direction and the upper body is not twisted.

In this case, in FIG. 1, "the fore-and-aft direction" and "the lateral direction" are the direction perpendicular to the paper surface and the lateral direction of the paper surface, respectively. In FIG. 2, "the fore-and-aft direction" and "the lateral direction" are the lateral direction of the paper surface and the direction perpendicular to the paper surface, respectively. Further, in the description of the present embodiment, the suffixes "R" and "L" attached to reference numerals will be used to mean the correspondence to the right side and left side of the vehicle 1, respectively.

The base body 9 is provided with a lower frame 11, to which the traveling motion unit 5 and the actuator 7 are installed, and a support frame 13 extendedly provided upward from the upper end of the lower frame 11.

A seat frame 15 extending toward the front from the support frame 13 is fixed to the top of the support frame 13. Further, the seat 3 on which an occupant sits is installed on the seat frame 15. In the present embodiment, the seat 3 serves as the payload supporting part for an occupant. Hence, the inverted pendulum type vehicle 1 in the present embodiment (hereinafter referred to simply as the vehicle 1) travels on a floor surface with an occupant seated on the seat 3.

Further, grips 17R and 17L to be grasped as necessary by the occupant seated on the seat 3 are disposed on the right and left of the seat 3. These grips 17R and 17L are secured to the distal portions of brackets 19R and 19L, respectively, which are provided extendedly from the support frame 13 (or the seat frame 15).

The lower frame 11 is provided with a pair of cover members 21R and 21L disposed to face each other in a forked shape with a gap therebetween in the lateral direction. The upper end portions (the forked portions) of these cover members 21R and 21L are connected through a hinge shaft 23 having a longitudinal axial center, so that one of the cover members 21R and 21L is relatively swingable about the hinge shaft 23 with respect to the other. In this case, the cover members 21R and 21L are biased by springs, which are not shown, in the direction in which the bottom end portions (the distal ends of the forked portions) of the cover members 21R and 21L narrow.

Further, a step 25R on which the occupant seated on the seat 3 rests his/her right foot and a step 25L on which the occupant rests his/her left foot are provided on the outer surfaces of the cover members 21R and 21L such that the steps extend out rightward and leftward, respectively.

The traveling motion unit 5 and the actuator 7 are disposed between the cover members 21R and 21L of the lower frame 11. The structures of the traveling motion unit 5 and the actuator 7 will be described with reference to FIG. 3 to FIG. 6.

The traveling motion unit 5 and the actuator 7 illustrated in the present embodiment have the same structures as those disclosed in, for example, FIG. 1 of the Patent Document 2 mentioned above. Hence, in the description of the present embodiment, the aspects of the structures of the traveling motion unit 5 and the actuator 7 which are described in the Patent Document 2 will be only briefly described.

In the present embodiment, the traveling motion unit 5 is a wheel assembly made of a rubber elastic material formed into an annular shape and has a substantially circular cross-sectional shape. This traveling motion unit 5 (hereinafter referred to as the wheel assembly 5) elastically deforms to be capable of rotating about a center C1 of the circular cross-section (more specifically, the circumferential line which passes the center C1 of the circular cross-section and which is concentric with the axial center of the wheel assembly 5), as indicated by an arrow Y1 in FIG. 5 and FIG. 6.

The wheel assembly 5 is disposed between the cover members 21R and 21L with an axial center C2 thereof (an axial center C2 orthogonal to the diametrical direction of the whole wheel assembly 5) oriented in the lateral direction, and comes in contact with a floor surface at the bottom end portion of the outer circumferential surface of the wheel assembly 5.

The wheel assembly 5 is capable of performing a motion of rotating about the axial center C2 of the wheel assembly as indicated by an arrow Y2 in FIG. 5 (a motion of circumrotating on a floor surface) and a motion of rotating about the center C1 of the cross-section of the wheel assembly 5 by being driven by the actuator 7 (to be discussed in detail later). As a result, the wheel assembly 5 is capable of traveling in all directions on a floor surface by the motions combining the rotating motions.

The actuator 7 is provided with a rotating member 27R and free rollers 29R interposed between the wheel assembly 5 and the right cover member 21R, a rotating member 27L and free rollers 29L interposed between the wheel assembly 5 and the left cover member 21L, an electric motor 31R serving as an actuator disposed above the rotating member 27R and the free rollers 29R, and an electric motor 31L serving as an actuator disposed above the rotating member 27L and the free rollers 29L.

The housings of the electric motors 31R and 31L are installed to the cover members 21R and 21L, respectively. Although not shown, the electric sources (batteries or capacitors) of the electric motors 31R and 31L are mounted on an appropriate place of the base body 9, such as the support frame 13 or the like.

The rotating member 27R is rotatively supported by the cover member 21R through the intermediary of a support axis 33R having a lateral axial center. Similarly, the rotating member 27L is rotatively supported by the cover member 21L through the intermediary of a support axis 33L having a lateral axial center. In this case, the rotational axial center of the rotating member 27R (the axial center of the support axis 33R) and the rotational axial center of the rotating member 27L (the axial center of the support axis 33L) are concentric with each other.

Figure 3:
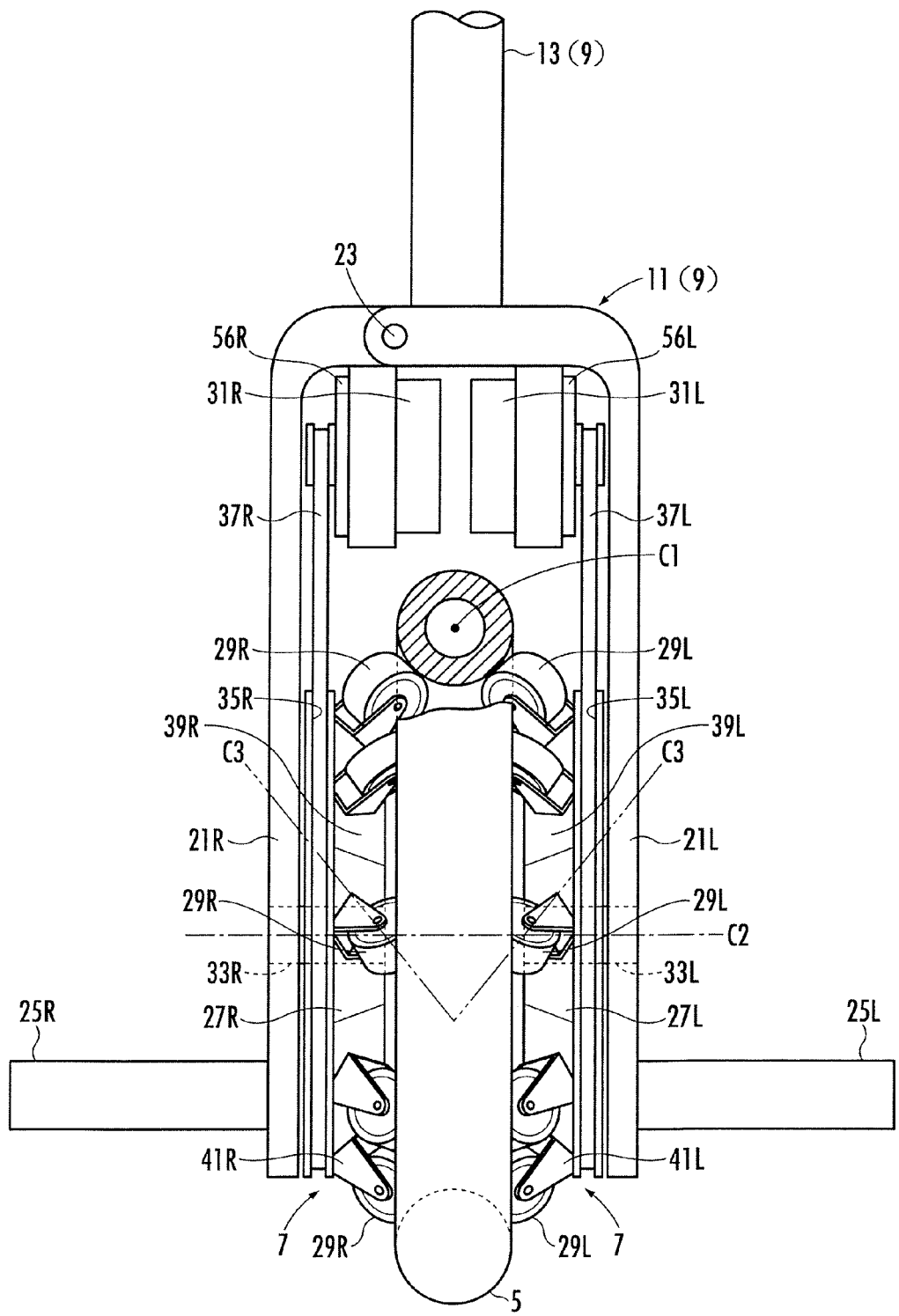
FIG. 3 is an enlarged view of a lower portion of the inverted pendulum type vehicle according to the embodiment.
Figure 4:
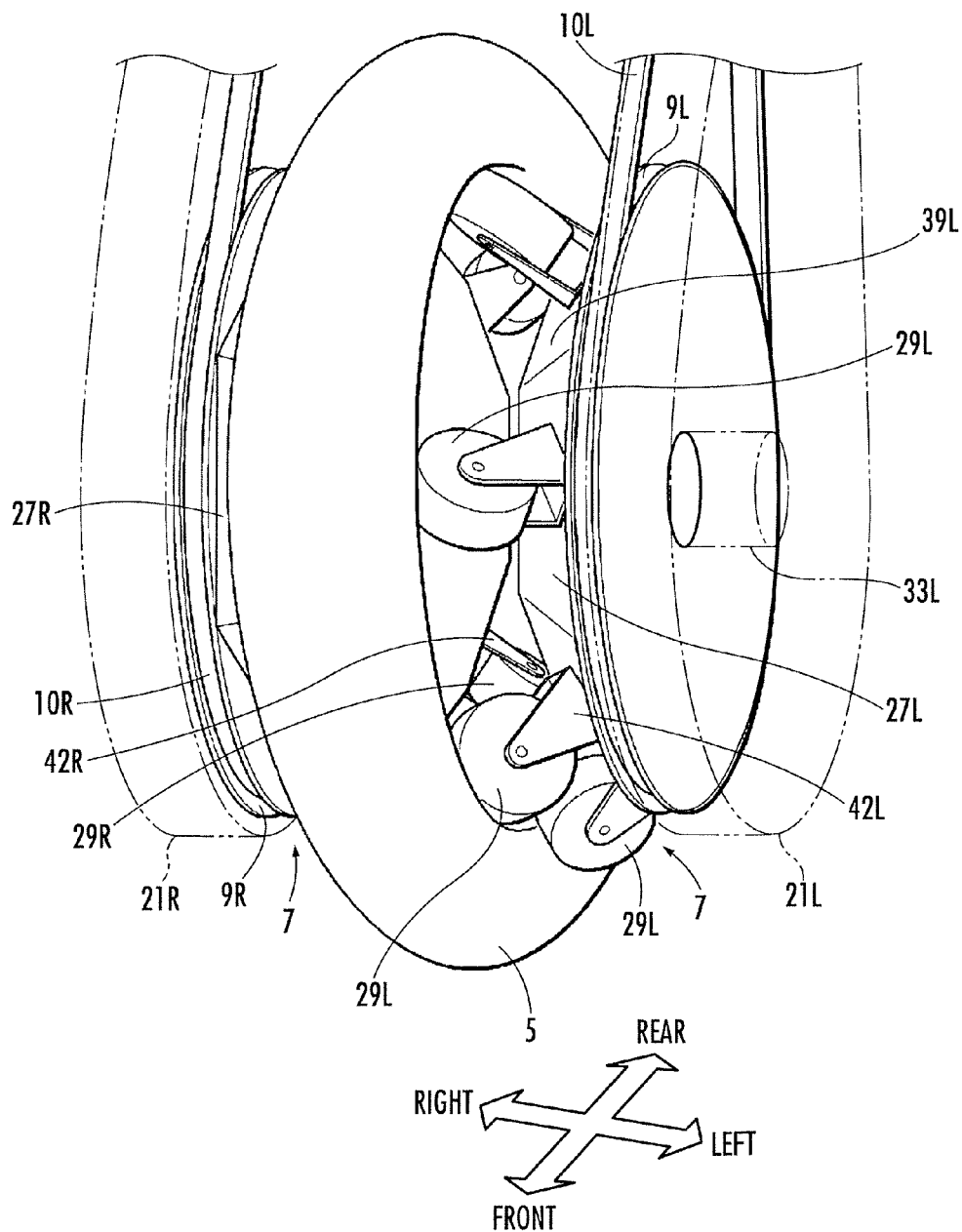
FIG. 4 is a perspective view of the lower portion of the inverted pendulum type vehicle according to the embodiment.

The rotating members 27R and 27L are connected to the output shafts of the electric motors 31R and 31L, respectively, through the intermediary of power transmission mechanisms, including functions as reducers, and rotatively driven by the motive power (torque) transmitted from the electric motors 31R and 31L, respectively. Each power transmission mechanisms are, for example, pulley and belt system. More specifically, as illustrated in FIG. 3, the rotating member 27R is connected to the output shaft of the electric motor 31R through the intermediary of a pulley 35R and a belt 37R. Similarly, the rotating member 27L is connected to the output shaft of the electric motor 31L through the intermediary of a pulley 35L and a belt 37L.

The power transmission mechanism may be constructed of, for example, a sprocket and a link chain, or may be constructed of a plurality of gears. As another alternative, for example, the electric motors 31R and 31L may be constructed such that the output shafts thereof are arranged to oppose the rotating members 27R and 27L so as to arrange the output shafts to be concentric with the rotating members 27R and 27L, and the output shafts of the electric motors 31R and 31L may be connected to the rotating members 27R and 27L, respectively, through the intermediary of reducers (e.g., planetary gear devices).

The rotating members 27R and 27L are formed in the same shapes as circular truncated cones, the diameters of which reduce toward the wheel assembly 5, and the outer peripheral surfaces thereof form tapered outer peripheral surfaces 39R and 39L.

A plurality of the free rollers 29R are arrayed about the tapered outer peripheral surface 39R of the rotating member 27R such that the free rollers 29R are arranged at regular intervals on the circumference concentric with the rotating member 27R. Further, these free rollers 29R are installed to the tapered outer peripheral surface 39R through the intermediary of the brackets 41R and rotatively supported by the brackets 41R.

Similarly, a plurality of free rollers 29L (of the same quantity as that of the free rollers 29R) are arrayed about the tapered outer peripheral surface 39L of the rotary member 27L such that the free rollers 29L are arrayed at regular intervals on the circumference concentric with the rotating member 27L. Further, these free rollers 29L are installed to the tapered outer peripheral surface 39L through the intermediary of the brackets 41L and rotatively supported by the brackets 41L.

The wheel assembly 5 is disposed concentrically with the rotating members 27R and 27L, and held between the free rollers 29R adjacent to the rotating member 27R and the free rollers 29L adjacent to the rotating member 27L.

Figure 6:
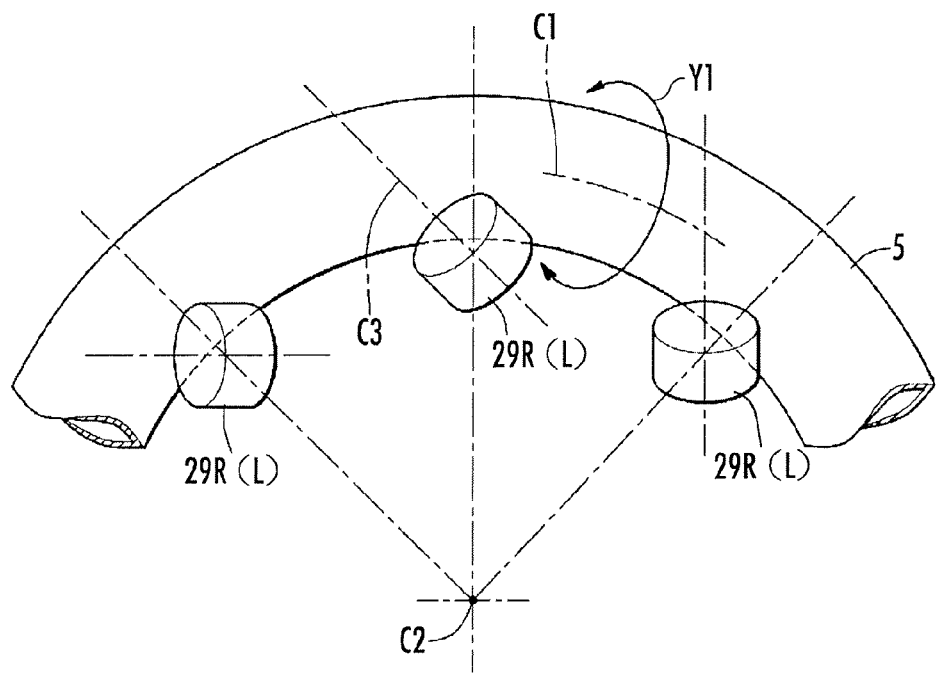
FIG. 6 is a diagram illustrating the placement relationship between the traveling motion unit (wheel assembly) and free rollers of the inverted pendulum type vehicle according to the embodiment.

In this case, as illustrated in FIG. 1 and FIG. 6, the free rollers 29R and 29L are disposed in postures in which the axial centers C3 thereof are inclined against the axial center C2 of the wheel assembly 5 and also inclined against the diametrical direction of the wheel assembly 5 (the radial direction connecting the axial center C2 and the free rollers 29R and 29L when the wheel assembly 5 is observed in the direction of the axial center C2 thereof). Further, in the postures, the outer peripheral surfaces of the free rollers 29R and 29L, respectively, are pressed into contact aslant with the inner peripheral surface of the wheel assembly 5.

More generally speaking, the right free rollers 29R are pressed into contact with the inner peripheral surface of the wheel assembly 5 in postures in which a frictional force component in the direction about the axial center C2 (a frictional force component in the tangential direction of the inner periphery of the wheel assembly 5) and a frictional force component in the direction about the center C1 of the cross-section of the wheel assembly 5 (a frictional force component in the tangential direction of the circular cross section) can be applied to the wheel assembly 5 at a surface in contact with the wheel assembly 5 when the rotating member 27R is rotatively driven about the axial center C2. The same applies to the left free rollers 29L.

In this case, as described above, the cover members 21R and 21L are biased by the springs, which are not shown, in the direction for narrowing the bottom end portions (the distal ends of the forked portions) of the cover members 21R and 21L. Thus, the urging force holds the wheel assembly 5 between the right free rollers 29R and the left free rollers 29L, and the free rollers 29R and 29L are maintained in the press contact with the wheel assembly 5 (more specifically, the press contact state that enables a frictional force to act between the free rollers 29R and 29L and the wheel assembly 5).

(Basic Operation of the Vehicle)

In the vehicle 1 having the structure described above, when the rotating members 27R and 27L are rotatively driven at the same velocity in the same direction by the electric motors 31R and 31L, respectively, the wheel assembly 5 will rotate about the axial center C2 in the same direction as those of the rotating members 27R and 27L. This causes the wheel assembly 5 to circumrotate on a floor surface in the fore-and-aft direction and the whole vehicle 1 will travel in the fore-and-aft direction. In this case, the wheel assembly 5 does not rotate about the center C1 of the cross-section thereof.

Further, if, for example, the rotating members 27R and 27L are rotatively driven in opposite directions from each other at velocities of the same magnitude, then the wheel assembly 5 will rotate about the center C1 of the cross section thereof. This causes the wheel assembly 5 to travel in the direction of the axial center C2 thereof (i.e., in the lateral direction), thus causing the whole vehicle 1 to travel in the lateral direction. In this case, the wheel assembly 5 does not rotate about the axial center C2 thereof.

Further, if the rotating members 27R and 27L are rotatively driven in the same direction or opposite directions at velocities that are different from each other (velocities including directions), then the wheel assembly 5 will rotate about the axial center C2 and also rotate about the center C1 of the cross-section thereof.

At this time, motions combining the rotational motions (combined motions) cause the wheel assembly 5 to travel in directions inclined relative to the fore-and-aft direction and the lateral direction, thus causing the whole vehicle 1 to travel in the same direction as that of the wheel assembly 5. The traveling direction of the wheel assembly 5 in this case will change, depending upon the difference between the rotational velocities, including the rotational directions, of the rotating members 27R and 27L (the rotational velocity vectors, the polarities of which are defined according to rotational directions).

The traveling motions of the wheel assembly 5 effected as described above. Therefore, by controlling the rotational velocities (including the rotational directions) of the electric motors 31R and 31L, and consequently by controlling the rotational velocities of the rotating members 27R and 27L, it becomes possible to control the traveling velocity and the traveling direction of the vehicle 1.

(Configuration of a Controller of the Vehicle)

The construction for controlling the operation of the vehicle 1 according to the present embodiment will now be described. In the following description, assuming an XYZ coordinate system, in which the longitudinal horizontal axis is indicated by an X-axis, the lateral horizontal axis is indicated by a Y-axis, and the vertical direction is indicated by a Z-axis, as illustrated in FIG. 1 and FIG. 2, the fore-and-aft direction and the lateral direction may be referred to as the X-axis direction and the Y-axis direction, respectively.

First, the control of the operation of the vehicle 1 will be outlined. According to the present embodiment, basically, if the occupant seated on the seat 3 tilts his/her upper body (more specifically, if the upper body is tilted such that the position of the overall center-of-gravity point combining the occupant and the vehicle 1 (the position projected onto a horizontal plane) is moved), then the base body 9 is tilted together with the seat 3 toward the side to which the upper body has been tilted. At this time, the traveling motion of the wheel assembly 5 is controlled such that the vehicle 1 travels toward the side to which the base body 9 has tilted. For example, if the occupant tilts his/her upper body forward, causing the base body 9 to tilt forward together with the seat 3, then the traveling motion of the wheel assembly 5 is controlled to cause the vehicle 1 to travel forward.

In other words, according to the present embodiment, the operation in which the occupant moves his/her upper body, causing the seat 3 and the base body 9 to tilt provides one basic steering operation for the vehicle 1 (a motion request of the vehicle 1), and the traveling motion of the wheel assembly 5 is controlled through the actuator 7 according to the steering operation.

Here, in the vehicle 1 according to the present embodiment, the ground contact surface of the wheel assembly 5 as the ground contact surface of the whole vehicle 1 will be a single local region which is smaller than a region resulting from projecting all the vehicle 1 and the occupant thereon onto a floor surface, and a floor reaction force will act only on the single local region. For this reason, in order to prevent the base body 9 from falling due to tilting, the wheel assembly 5 must be moved such that the overall center-of-gravity point of the occupant and the vehicle 1 is positioned substantially right above the ground contact surface of the wheel assembly 5.

Therefore, according to the present embodiment, the posture of the base body 9 in a state wherein the overall center-of-gravity point of the occupant and the vehicle 1 is positioned substantially right above the central point of the wheel assembly 5 (the central point on the axial center C2) (more precisely, in a state wherein the center-of-gravity point is positioned substantially right above the ground contact surface of the wheel assembly 5) is defined as a desired posture, and basically, the traveling motion of the wheel assembly 5 is controlled such that the actual posture of the base body 9 is converged to the desired posture.

Further, in a state wherein the occupant is not aboard the vehicle 1, the posture of the base body 9 in a state which the center-of-gravity point of the vehicle 1 alone is positioned substantially right above the central point of the wheel assembly 5 (the central point on the axial center C2) (a state wherein the center-of-gravity point is positioned substantially right above the ground contact surface of the wheel assembly 5) is defined as a desired posture, and the actual posture of the base body 9 is converged to the desired posture. Thus, the traveling motion of the wheel assembly 5 is controlled such that the vehicle 1 supports itself without causing the base body 9 to fall from tilting.

Either in the state where the occupant is aboard the vehicle 1 or in the state where the occupant is not aboard the vehicle 1, the motion operation of the wheel assembly 5 is controlled to increase the travelling velocity of the vehicle 1 when the deviation of the actual posture of the base body 9 from the desired posture becomes greater and to stop the vehicle 1 from travelling in a state where the actual posture of the base body 9 matches the desired posture.

In the present embodiment, as illustrated in FIG. 1 and FIG. 2, in order to control the operation of the vehicle 1 as described above, a control unit 50 composed of an electronic circuit unit which mainly includes a microcomputer and a drive circuit unit for the electric motors 31R and 31L, a tilt sensor 52 for measuring a tilt angle θb relative to the vertical direction (the gravitational direction) of a predefined portion of the base body 9 and a changing velocity thereof (=dθb/dt), a load sensor 54 for detecting whether or not an occupant is aboard the vehicle 1, and rotary encoders 56R and 56L serving as angle sensors for detecting the rotational angles and the rotational angular velocities of the output shafts of the electric motors 31R and 31L, respectively, are mounted at appropriate places of the vehicle 1.

In this case, the control unit 50 and the tilt sensor 52 are installed to the support frame 13 by, for example, being accommodated in the support frame 13 of the base body 9. Further, the load sensor 54 is incorporated in the seat 3. Further, the rotary encoders 56R and 56L are provided integrally with the electric motors 31R and 31L, respectively. The rotary encoders 56R and 56L may alternatively be attached to the rotating members 27R and 27L, respectively.

More specifically, the tilt sensor 52 is constructed of an acceleration sensor and a rate sensor (angular velocity sensor), such as a gyro sensor, and outputs detection signals of these sensors to the control unit 50. Then, the control unit 50 performs predefined measurement arithmetic process (this may be publicly known arithmetic process) on the basis of the outputs of the acceleration sensor and the rate sensor of the tilt sensor 52 thereby to calculate the measured value of the tilt angle θb of the portion, to which the tilt sensor 52 is installed (the support frame 13 in the present embodiment), relative to the vertical direction and the measured value of the tilt angular velocity θbdot, which is a change rate (differential value) thereof.

In this case, to be more specific, the tilt angle θb to be measured (hereinafter referred to a base body tilt angle θb in some cases) is composed of a component in the direction about the Y-axis (a pitch direction) θb_x and a component in the direction about the X-axis (a roll direction) θb_y. Similarly, the tilt angular velocity θbdot to be measured (hereinafter referred to a base body tilt angular velocity θbdot in some cases) is composed of a component in the direction about the Y-axis (the pitch direction) θbdot_x (=dθb_x/dt) and a component in the direction about the X-axis (the roll direction) θbdot_y (=dθb_y/dt).

In the description of the present embodiment, regarding variables, such as a motional state amount having components in directions of the X-axis and the Y-axis, such as the base body tilt angle θb (or directions about each axes), or variables, such as coefficients related to the motional state amount, the reference numerals of the variables will be accompanied by a suffix "_x" or "_y" to distinguishably denote the components.

Accordingly, for the variables related to translational motions related to a translational velocity, a component in the X-axis direction thereof will be accompanied by the suffix "_x" and a component in the Y-axis direction thereof will be accompanied by the suffix "_y."

Meanwhile, for the variables related to rotational motions, such as angles, rotational velocities (angular velocities), and angular acceleration, for the purpose of convenience, a component in the direction about the Y-axis will be accompanied by the suffix "_x" and a component in the direction about the X-axis will be accompanied by the suffix "_y" in order to match the variables related to translational motions with suffixes.

Further, to denote a variable in the form of a pair of a component in the X-axis direction (or a component in the direction about the Y-axis) and a component in the Y-axis direction (or a component in the direction about the X-axis), the suffix "_xy" is added to the reference numeral of the variable. For example, to express the base body tilt angle θb in the form of the pair of a component in the direction about the Y-axis θb_x and a component in the direction about the X-axis θb_y, it will be denoted as the base body tilt angle θb_xy.

The load sensor 54 is incorporated in the seat 3 so as to be subjected to a load from the weight of an occupant when the occupant sits on the seat 3, and outputs a detection signal based on the load to the control unit 50. Then, the control unit 50 determines whether or not the occupant is aboard the vehicle 1 on the basis of the measured value of the load indicated by the output of the load sensor 54.

In place of the load sensor 54, a switch type sensor which, for example, turns on when an occupant sits on the seat 3 may be used.

The rotary encoder 56R generates a pulse signal each time the output shaft of the electric motor 31R rotates for a predefined angle, and outputs the pulse signal to the control unit 50. Then, based on the pulse signal, the control unit 50 measures the rotational angle of the output shaft of the electric motor 53R and further measures the temporal change rate (differential value) of the measured value of the rotational angle as the rotational angular velocity of the electric motor 53R. The same applies to the rotary encoder 56L for the electric motor 31L.

The control unit 50 performs a predefined arithmetic process by using the measured values thereby to determine velocity commands, which are the desired values of the rotational angular velocities of the electric motors 31R and 31L, respectively, and performs a feedback control on the rotational angular velocity of each of the electric motors 31R and 31L according to the determined velocity commands.

The rotational angular velocity of the output shaft of the electric motor 31R and the rotational angular velocity of the rotating member 27R have a proportional relationship based on the speed reduction ratio of a constant value between the output shaft and the rotating member 27R. Hence, for the sake of convenience, in the description of the present embodiment, the rotational angular velocity of the electric motor 31R may be used to express the rotational angular velocity of the rotating member 27R. Similarly, the rotational angular velocity of the electric motor 31L may be used to express the rotational angular velocity of the rotating member 27L.

(Summary of the Control Method of the Vehicle)

The following will describe in more detail the control process performed by the control unit 50.

Figure 7:
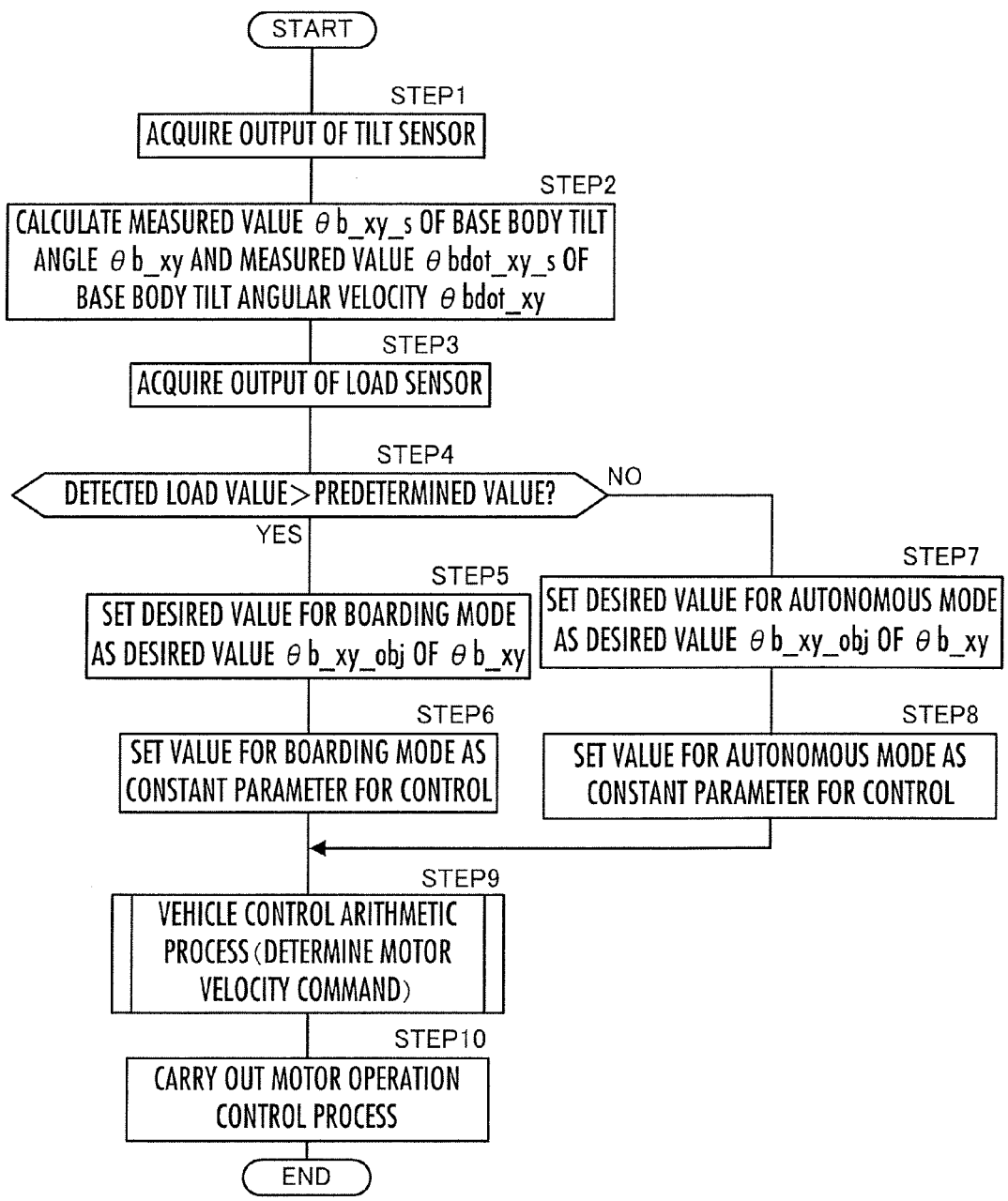
FIG. 7 is a flowchart illustrating a process performed by a control unit of the inverted pendulum type vehicle according to the embodiment.

The control unit 50 executes the control process (main routine process) illustrated by the flowchart of FIG. 7 at a predefined control process cycle.

First, in STEP 1, the control unit 50 acquires an output of a tilt sensor 52.

Subsequently, the control unit 50 proceeds to STEP 2 to calculate a measured value $\theta b\_xy\_s$ of a base body tilt angle $\theta b$ and a measured value $\theta bdot\_xy\_s$ of a base body tilt angular velocity $\theta bdot$ on the basis of the acquired output of the tilt sensor 52.

In the following description, when using a reference numeral to denote the observed value (the measured value or an estimated value) of an actual value of a variable (a state amount), such as the measured value $\theta b\_xy\_s$, the reference numeral of the variable will have a suffix "_s".

Next, after acquiring an output of a load sensor 54 in STEP 3, the control unit 50 performs a determination process in STEP 4. In the determination process, the control unit 50 determines whether or not the vehicle 1 has an occupant aboard (whether or not an occupant is sitting on the seat 3) by determining whether or not the load measured value indicated by the acquired output of the load sensor 54 is larger or not than a predefined value which has been set beforehand.

If the determination result in STEP 4 is affirmative, then the control unit 50 performs a process for setting a desired value $\theta b\_xy\_obj$ of the base body tilt angle $\theta b$ and a process for setting the values of constant parameters (e.g., the basic values of various gains) for controlling the operation of the vehicle 1 in STEP 5 and STEP 6, respectively.

In STEP 5, the control unit 50 sets a predefined desired value for a boarding mode as the desired value $\theta b\_xy\_obj$ of the base body tilt angle $\theta b$.

Here, the term "boarding mode" means the operation mode of the vehicle 1 in the case where the occupant is aboard the vehicle 1. The desired value $\theta b\_xy\_obj$ for the boarding mode is preset such that desired value $\theta b\_xy\_obj$ coincides or substantially coincides with the measured value $\theta b\_xy\_s$ of the base body tilt angle $\theta b$ measured on the basis of an output of the tilt sensor 52 in a posture of the base body 9 in which the overall center-of-gravity point of the vehicle 1 and the occupant seated on the seat 3 (hereinafter referred to as the vehicle-occupant overall center-of-gravity point) is positioned substantially right above a ground contact surface of the wheel assembly 5.

Thereafter, in STEP 6, the control unit 50 sets predefined values for the boarding mode as the values of constant parameters for controlling the operation of the vehicle 1. The constant parameters include, for example, hx, hy, Ki_a_x, Ki_b_x, Ki_a_y, and Ki_b_y (i=1, 2, 3), which will be discussed later.

On the other hand, if the determination result in STEP 4 is negative, then the control unit 50 performs the process for setting a desired value $\theta b\_xy\_obj$ of a base body tilt angle $\theta b\_xy$ and the process for setting the values of constant parameters for controlling the operation of the vehicle 1 in STEP 7 and STEP 8, respectively.

In STEP 7, the control unit 50 sets a predefined desired value for an autonomous mode as the desired value $\theta b\_xy\_obj$ of the base body tilt angle $\theta b$.

Here, the term "autonomous mode" means an operation mode of the vehicle 1 in the case where the occupant is not aboard the vehicle 1. The desired value $\theta b\_xy\_obj$ for the autonomous mode is preset such that desired value $\theta b\_xy\_obj$ coincides or substantially coincides with the measured value $\theta b\_xy\_s$ of the base body tilt angle $\theta b$ measured on the basis of an output of the tilt sensor 52 in a posture of the base body 9 in which the center-of-gravity point of the vehicle 1 alone (hereinafter referred to as the vehicle-alone center-of-gravity point) is positioned substantially right above the ground contact surface of the wheel assembly 5. The desired value $\theta b\_xy\_obj$ for the autonomous mode is generally different from the desired value $\theta b\_xy\_obj$ for the boarding mode.

In STEP 8, the control unit 50 sets predefined values for the autonomous mode as the values of constant parameters for controlling the operation of the vehicle 1. The values of the constant parameters for the autonomous mode are different from the values of the constant parameters for the boarding mode.

The values of the constant parameters are set to be different between the boarding mode and the autonomous mode, because the response characteristics of the operations of the vehicle 1 relative to control inputs are different from each other due to the differences in the height of the center-of-gravity point, the overall mass, and the like between the respective modes.

According to the processes from STEP 4 to STEP 8 described above, the desired value $\theta b\_xy\_obj$ of the base body tilt angle $\theta b\_xy$ and the values of the constant parameters are set for each of the operational modes, namely, the boarding mode and the autonomous mode.

It is not essential to perform the process in STEP 5 and STEP 6 or the process in STEP 7 and STEP 8 for each control processing cycle. Alternatively, the process may be performed only when the determination result in STEP 4 changes.

Supplementally, in both the boarding mode and the autonomous mode, the desired value of a component $\theta bdot\_x$ in the direction about a Y-axis of the base body tilt angular velocity $\theta bdot$ and the desired value of a component $\theta bdot\_y$ in the direction about an X-axis thereof are both 0. Therefore, it is unnecessary to perform the process for setting a desired value of the base body tilt angular velocity $\theta bdot\_xy$.

After performing the process in STEP 5 and STEP 6 or the process in STEP 7 and STEP 8 as described above, the control unit 50 performs vehicle control arithmetic process in STEP 9 thereby to determine the speed commands for electric motors 31R and 31L, respectively. The vehicle control arithmetic process will be discussed in detail hereinafter.

Subsequently, the control unit 50 proceeds to STEP 10 to perform the process for controlling the operations of the electric motors 31R and 31L according to the speed commands determined in STEP 9. In this operation control process, based on the difference between the speed command for the electric motor 31R determined in STEP 9 and the measured value of the rotational speed of the electric motor 31R measured on the basis of an output of a rotary encoder 56R, the control unit 50 determines a desired value (desired torque) of an output torque of the electric motor 31R such that the difference is converged to 0. Then, the control unit 50 controls the current supplied to the electric motor 31R such that the electric motor 31R outputs an output torque of the desired torque. The same applies to the operation control of the left electric motor 31L.

The above has described the general control process performed by the control unit 50.

(Details of the Control Method of the Vehicle)

The vehicle control arithmetic process in STEP 9 mentioned above will now be described in detail.

In the following description, the vehicle-occupant overall center-of-gravity point in the boarding mode and the vehicle-alone center-of-gravity point in the autonomous mode are generically referred to as the vehicle system center-of-gravity point. The vehicle system center-of-gravity point is referred to as the vehicle-occupant overall center-of-gravity point when the operational mode of the vehicle 1 is in the boarding mode and is referred to as the vehicle-alone center-of-gravity point when the operational mode of the vehicle 1 is in the autonomous mode.

Further, in the following description, regarding the values (updated values) determined at each control processing cycle by the control unit 50, a value determined at a current (latest) control processing cycle may be referred to as a current value, and a value determined at an immediately preceding control processing cycle may be referred to as a previous value. Further, a value generally denotes a current value unless otherwise specified as a current value or a previous value.

Further, regarding the velocity and acceleration in the X-axis direction, a forward-facing direction will be defined as a positive direction, and regarding the velocity and acceleration in the Y-axis direction, a left-facing direction will be defined as the positive direction.

Figure 8:
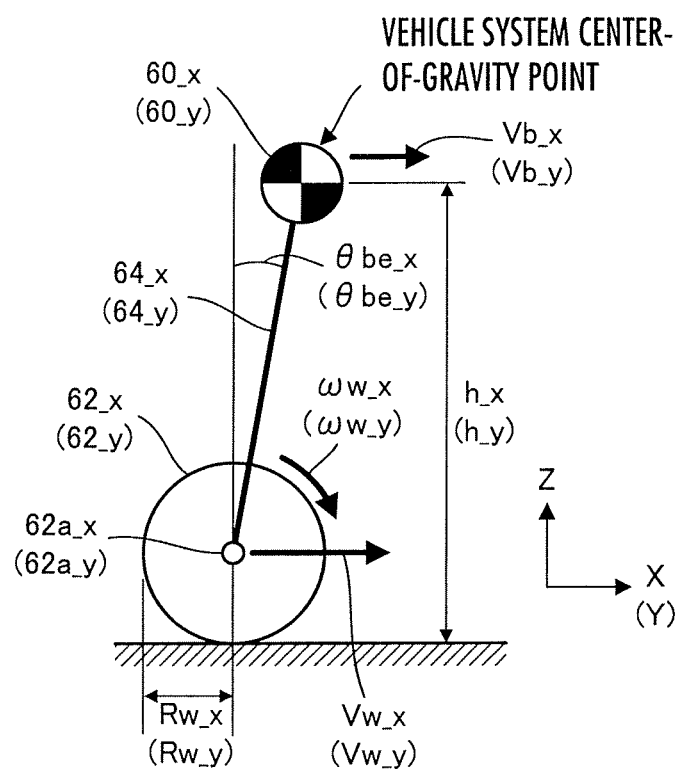
FIG. 8 is a diagram illustrating an inverted pendulum model expressing the dynamic behaviors of the inverted pendulum type vehicle according to the embodiment.

In the present embodiment, the vehicle control arithmetic process in STEP 9 is performed, assuming that the dynamic behaviors of the vehicle system center-of-gravity point (more specifically, the behaviors observed by projecting the behaviors from the Y-axis direction onto a plane (XZ plane) which is orthogonal thereto, and the behaviors observed by projecting the behaviors from the X-axis direction onto a plane (YZ plane) which is orthogonal thereto) are approximately expressed by the behaviors of an inverted pendulum model (dynamic behaviors of the inverted pendulum), as shown in FIG. 8.

In FIG. 8, the reference numerals without parenthesis denote the reference numerals associated with the inverted pendulum model observed from the Y-axis direction, while the reference numerals in parenthesis denote the reference numerals associated with the inverted pendulum model observed from the X-axis direction.

In this case, the inverted pendulum model expressing a behavior observed from the Y-axis direction is provided with a mass point 60_x positioned at the vehicle system center-of-gravity point and a imaginary wheel 62_x, which has a rotational axis 62a_x parallel to the Y-axis direction and which freely circumrotate on a floor surface (hereinafter referred to as the imaginary wheel 62_x). Further, the mass point 60_x is supported by a rotational shaft 62a_x of the imaginary wheel 62_x through the intermediary of a linear rod 64_x such that the mass point 60_x is swingable about the rotational shaft 62a_x, using the rotational shaft 62a_x as a fulcrum.

In this inverted pendulum model, a motion of the mass point 60_x corresponds to a motion of the vehicle system center-of-gravity point observed from the Y-axis direction. Further, it is assumed that the tilt angle θbe_x of the rod 64_x relative to a vertical direction coincides with a difference θbe_x_s between a base body tilt angle measured value θb_x_s in the direction about the Y-axis and a base body tilt angle desired value θb_x_obj (=θb_x_s−θb_x_obj). It is also assumed that a changing velocity of the tilt angle θbe_x of the rod 64_x (=dθbe_x/dt) coincides with a base body tilt angular velocity measured value θbdot_x_s in the direction about the Y-axis. Further, it is assumed that a moving velocity Vw_x of the imaginary wheel 62_x (the translational moving velocity in the X-axis direction) coincides with the moving velocity of the wheel assembly 5 of the vehicle 1 in the X-axis direction.

Similarly, the inverted pendulum model expressing a behavior observed from the X-axis direction (refer to the reference numerals in parenthesis in FIG. 8) is provided with a mass point 60_y positioned at the vehicle system center-of-gravity point and a imaginary wheel 62_y, which has a rotational axis 62a_y parallel to the X-axis direction and which freely circumrotate on a floor surface (hereinafter referred to as the imaginary wheel 62_y). Further, the mass point 60_y is supported by a rotational shaft 62a_y of the imaginary wheel 62_y through the intermediary of a linear rod 64_y such that the mass point 60_y is swingable about the rotational shaft 62a_y, using the rotational shaft 62a_y as the supporting point.

In this inverted pendulum model, a motion of the mass point 60_y corresponds to a motion of the vehicle system center-of-gravity point observed from the X-axis direction. Further, it is assumed that the tilt angle θbe_y of the rod 64_y relative to the vertical direction coincides with a difference θbe_y_s between a base body tilt angle measured value θb_y_s in the direction about the X-axis and a base body tilt angle desired value θb_y_obj (=θb_y_s−θb_y_obj). It is also assumed that a changing velocity of the tilt angle θbe_y of the rod 64_y (=dθbe_y/dt) coincides with a base body tilt angular velocity measured value θbdot_y_s in the direction about the X-axis. Further, it is assumed that a moving velocity Vw_y of the imaginary wheel 62_y (the translational moving velocity in the Y-axis direction) coincides with the moving velocity of the wheel assembly 5 of the vehicle 1 in the Y-axis direction.

It is assumed that the imaginary wheels 62_x and 62_y have radii Rw_x and Rw_y of predefined values, respectively.

It is assumed that relationships represented by expressions 01a and 01b given below hold between rotational angular velocities ωw_x and ωw_y of the imaginary wheels 62_x and 62_y, respectively, and rotational angular velocities ω_R and ω_L of the electric motors 31R and 31L, respectively (more accurately, the rotational angular velocities ω_R and ω_L of rotational members 27R and 27L, respectively).

$$\omega w\_x = (\omega\_R + \omega\_L)/2 \qquad \text{Expression 01a}$$

$$\omega w\_y = C \cdot (\omega\_R - \omega\_L)/2 \qquad \text{Expression 01b}$$

Wherein, "C" in the expression 01b denotes a coefficient of a predefined value that depends on a mechanical relationship or slippage between free rollers 29R and 29L and the wheel assembly 5. The positive directions of ωw_x, ω_R and ω_L are the directions in which the imaginary wheel 62_x rotates in the case where the imaginary wheel 62_x circumrotates forward. The positive direction of ωw_y is the direction in which the imaginary wheel 62_y rotates in the case where the imaginary wheel 62_y circumrotates leftwards.

The dynamics of the inverted pendulum model shown in FIG. 8 is represented by expressions 03x and 03y given below. Herein, the expression 03x represents the dynamics of the inverted pendulum model observed from the Y-axis direction, and the expression 03y represents the dynamics of the inverted pendulum model observed from the X-axis direction.

$$d^2\theta be\_x/dt^2 = \alpha\_x \cdot \theta be\_x + \beta\_x \cdot \omega wdot\_x \quad \text{Expression 03x}$$

$$d^2\theta be\_y/dt^2 = \alpha\_y + \theta be\_y + \beta\_y \cdot \omega wdot\_y \quad \text{Expression 03y}$$

Wherein, ωwdot_x in the expression 03x denotes the rotational angular acceleration (first-order differential value of the rotational angular velocity ωw_x) of the imaginary wheel 62_x, α_x denotes a coefficient which depends on a mass or a height h_x of the mass point 60_x, and β_x denotes a coefficient which depends on an inertia (inertial moment) or the radius Rw_x of the imaginary wheel 62_x. The same applies to ωwdot_y, α_y, and β_y in the expression 03y.

As may be understood from these expressions 03x and 03y, the motions of the mass points 60_x and 60_y of the inverted pendulum (i.e., the motions of the vehicle system center-of-gravity point) are specified, depending on the rotational angular acceleration ωwdot_x of the imaginary wheel 62_x and the rotational angular acceleration ωwdot_y of the imaginary wheel 62_y, respectively.

In the present embodiment, therefore, the rotational angular acceleration ωwdot_x of the imaginary wheel 62_x is used as the manipulated variable (control input) for controlling the motion of the vehicle system center-of-gravity point observed from the Y-axis direction, while the rotational angular acceleration ωwdot_y of the imaginary wheel 62_y is used as the manipulated variable (control input) for controlling the motion of the vehicle system center-of-gravity point observed from the X-axis direction.

To briefly describe the vehicle control arithmetic process in STEP5, the control unit 50 determines imaginary wheel rotational angular acceleration commands ωwdot_x_cmd and ωwdot_y_cmd, which are the command values (desired values) of the rotational angular accelerations ωwdot_x and ωwdot_y as the manipulated variables such that the motion of the mass point 60_x observed in the X-axis direction and the motion of the mass point 60_y observed in the Y-axis direction become the motions corresponding to desired motions of the vehicle system center-of-gravity point. Further, the control unit 50 determines the values obtained by integrating the imaginary wheel rotational angular acceleration commands ωwdot_x_cmd and ωwdot_y_cmd, respectively, as the imaginary wheel rotational angular velocity commands ωw_x_cmd and ωw_y_cmd, which are the command values (desired values) of the rotational angular velocities ωw_x and ωw_y of the imaginary wheels 62_x and 62_y, respectively.

Further, the control unit 50 defines the moving velocity of the imaginary wheel 62_x corresponding to the imaginary wheel rotational angular velocity command ωw_x_cmd (=Rw_x·ωw_x_cmd) and the moving velocity of the imaginary wheel 62_y corresponding to the imaginary wheel rotational angular velocity command ωw_y_cmd (=Rw_y·ωw_y_cmd) as the desired moving velocity of the wheel assembly 5 of the vehicle 1 in the X-axis direction and the desired moving velocity thereof in the Y-axis direction, respectively, and the control unit 50 determines velocity commands ω_R_cmd and ω_L_cmd of the electric motors 31R and 31L, respectively, so as to achieve the desired moving velocities.

In the present embodiment, the imaginary wheel rotational angular acceleration commands ωwdot_x_cmd and ωwdot_y_cmd as the manipulated variables (control inputs) are determined by adding up three manipulated variable components, as indicated by expressions 07x and 07y, which will be discussed later.

Supplementally, in the present embodiment, in the imaginary wheel rotational angular acceleration commands ωwdotx_cmd and ωwdot_y_cmd serving as the manipulated variables (control inputs), since ωwdotx_cmd is related to the rotational angular velocity of the imaginary wheel 62_x moving in the X-axis direction, it functions as the manipulated variable for defining the driving power applied to the wheel assembly 5 to move the wheel assembly 5 in the X-axis direction; similarly, since ωwdot_y_cmd is related to the rotational angular velocity of the imaginary wheel 62_y moving in the Y-axis direction, it functions as the manipulated variable for defining the driving power applied to the wheel assembly 5 to move the wheel assembly 5 in the Y-axis direction.

Figure 9:
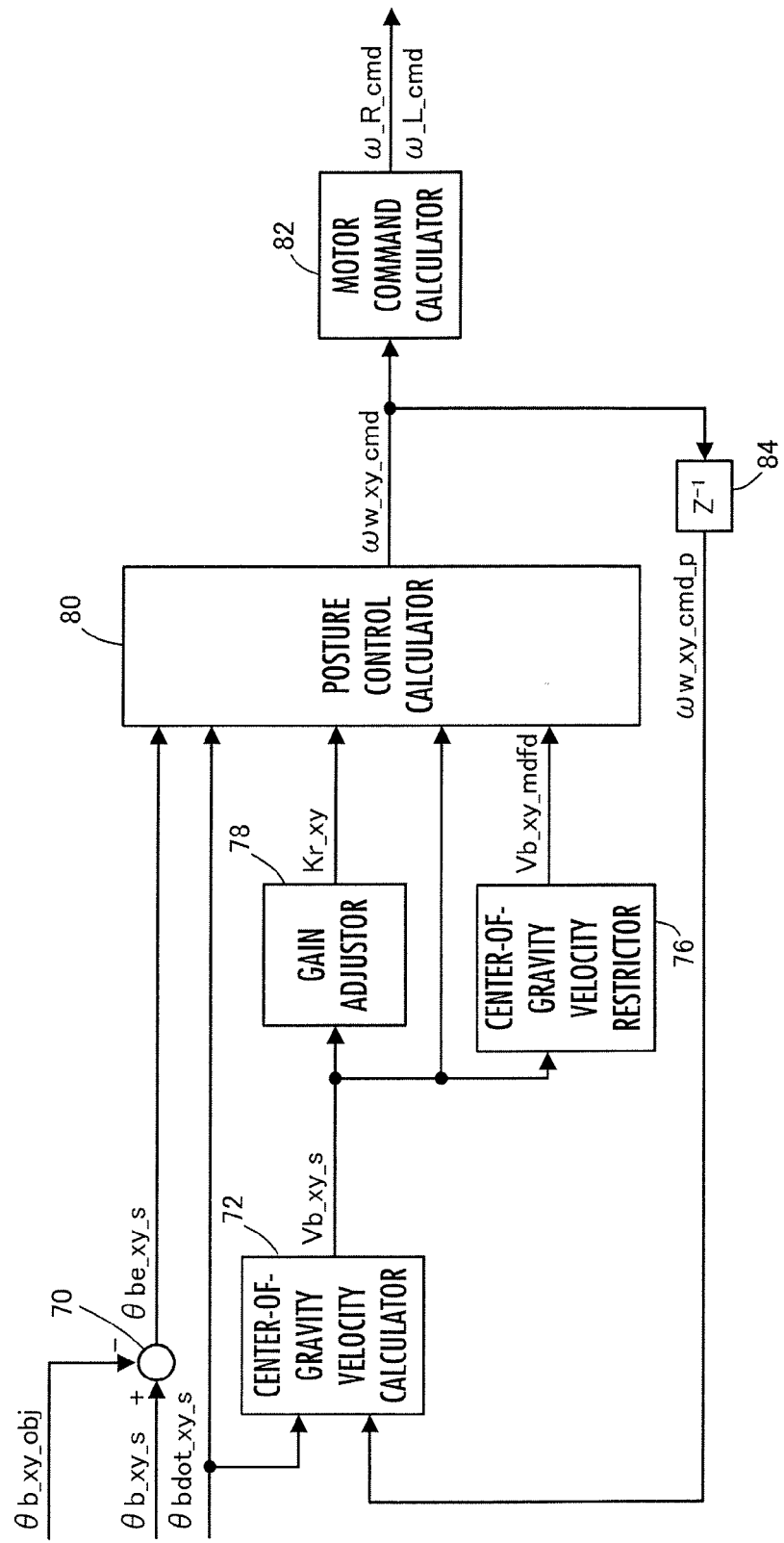
FIG. 9 is a block diagram illustrating a processing function related to the process in STEP 9 of FIG. 7.

As illustrated in the block diagram of FIG. 9, the control unit 50 is provided with the functions for performing the vehicle control arithmetic process in STEP 9 as described above.

More specifically, the control unit 50 is provided with an error calculator 70 which calculates the base body tilt angle error measured value θbe_xy_s, which is the difference between the base body tilt angle measured value θb_xy_s and the base body tilt angle desired value θb_xy_obj, a center-of-gravity velocity calculator 72 which calculates an estimated center-of-gravity velocity value Vb_xy_s as an observed value of a center-of-gravity velocity Vb_xy which is the moving velocity of the vehicle system center-of-gravity point, a center-of-gravity velocity restrictor 76 which determines a desired center-of-gravity velocity for control Vb_xy_mdfd as the desired value of the center-of-gravity velocity Vb_xy by taking into account a restriction based on a permissible range of the rotational angular velocities of the electric motors 31R and 31L, and a gain adjustor 78 which determines a gain adjustment parameter Kr_xy for adjusting the values of the gain coefficients of expressions 07x and 07y, which will be discussed later.

The control unit 50 is further provided with a posture control calculator 80 configured to calculate the imaginary wheel rotational angular velocity command ωw_xy_cmd, and a motor command calculator 82 configured to convert the imaginary wheel rotational angular velocity command ωw_xy_cmd into a pair of a velocity command ω_R_cmd (a command value of a rotational angular velocity) for the right electric motor 31R and a velocity command ω_L_cmd (a command value of a rotational angular velocity) for the left electric motor 31L.

Reference numeral 84 in FIG. 9 denotes a delay element which receives the imaginary wheel rotational angular velocity command ωw_xy_cmd calculated at each control processing cycle by a posture control calculator 80. The delay element 84 outputs a previous value ωw_xy_cmd_p of the imaginary wheel rotational angular velocity command ωw_xy_cmd at each control processing cycle.

The vehicle control arithmetic process in STEP 9 described above is performed by the processing sections as described below.

First, the control unit 50 performs the process by the error calculator 70 and the process by the center-of-gravity velocity calculator 72.

The error calculator 70 receives the base body tilt angle measured values θb_xy_s (θb_x_s and θb_y_s) calculated in the STEP2 and the desired values θb_xy_obj (θb_x_obj and θb_y_obj) set in the STEP5 or STEP7. Then, the error calculator 70 subtracts θb_x_obj from θb_x_s to calculate the base body tilt angle error measured value θbe_x_s (=θb_x_s−θb_x_obj) in the direction about the Y-axis, and also subtracts θb_y_obj from θb_y_s to calculate the base body tilt angle error measured value θbe_y_s (=θb_y_s−θb_y_obj) in the direction about the X-axis.

The process by the error calculator 70 may be performed before the vehicle control arithmetic process in STEP5. For example, the process by the error calculator 70 may be performed during the process in the STEP5 or STEP7.

The center-of-gravity velocity calculator 72 receives the current value of the base body tilt angular velocity measured values θbdot_xy_s (θbdot_x_s and θbdot_y_s) calculated in the STEP2 and also receives the previous value ωw_xy_cmd_p of the imaginary wheel velocity command ωw_xy_cmd (ωw_x_cmd_p and ωw_y_cmd_p) from the delay element 84. Then, the center-of-gravity velocity calculator 72 calculates an estimated center-of-gravity velocity value Vb_xy_s (Vb_x_s and Vb_y_s) from the above input values according to a predefined arithmetic expression based on the inverted pendulum model.

More specifically, the center-of-gravity velocity calculator 72 calculates Vb_x_s and Vb_y_s according to the following expression 05x and expression 05y, respectively.

$$Vb\_x\_s = Rw\_x \cdot \omega w\_x\_cmd\_p + h\_x \cdot \theta bdot\_x\_s \quad 05x$$

$$Vb\_y\_s = Rw\_y \cdot \omega w\_y\_cmd\_p + h\_y \cdot \theta bdot\_y\_s \quad 05y$$

In the expressions 05x and 05y, Rw_x and Rw_y denote the radii of the imaginary wheels 62_x and 62_y, respectively, as described above, and the values thereof are predefined values set preliminarily. Further, reference characters h_x and h_y denote the heights of the mass points 60_x and 60_y, respectively, of the inverted pendulum model. In the present embodiment, the height of the vehicle system center-of-gravity point is maintained to be substantially constant. Thus, the predefined values set preliminarily are used as the values of h_x and h_y, respectively. Supplementally, the heights h_x and h_y are included in the constant parameters for setting the values in the STEP 6 or STEP 8.

The first term of the right side of the expression 05x given above denotes the moving velocity of the imaginary wheel 62_x in the X-axis direction, which corresponds to the previous value ωw_x_cmd_p of the velocity command of the imaginary wheel 62_x. This moving velocity corresponds to the current value of an actual moving velocity of the wheel assembly 5 in the X-axis direction. Further, the second term of the right side of the expression 05x corresponds to the current value of the moving velocity of the vehicle system center-of-gravity point in the X-axis direction attributable to the base body 9 tilting at a tilt angular velocity of θbdot_x_s in the direction about the Y-axis (relative moving velocity in relation to the wheel assembly 5). The same applies to the expression 05y.

Alternatively, the pair of the measured values (the current values) of the rotational angular velocities of the electric motors 31R and 31L, respectively, which are measured on the basis of the outputs of the rotary encoders 56R and 56L, may be converted into the pair of the rotational angular velocities of the imaginary wheels 62_x and 62_y, respectively, then the rotational angular velocities may be used in place of ωw_x_cmd_p and ωw_y_cmd_p of expressions 05x and 05y. However, in order to eliminate the influences of noises contained in the measured values of the rotational angular velocities, it is advantageous to use ωw_x_cmd_p and ωw_y_cmd_p, which are desired values.

Subsequently, the control unit 50 performs the process by the center-of-gravity velocity restrictor 76 and the process by the gain adjustor 78. In this case, the center-of-gravity velocity restrictor 76 and the gain adjustor 78 respectively receive the estimated center-of-gravity velocity values Vb_xy_s (Vb_x_s and Vb_y_s) calculated by the center-of-gravity velocity calculator 72 as described above.

Thereafter, the gain adjustor 78 determines the gain adjustment parameters Kr_xy (Kr_x and Kr_y) on the basis of the input estimated center-of-gravity velocity values Vb_xy_s (Vb_x_s and Vb_y_s).

The process performed by the gain adjustor 78 will be described hereinafter with reference to FIG. 10 and FIG. 11.

Figure 10:
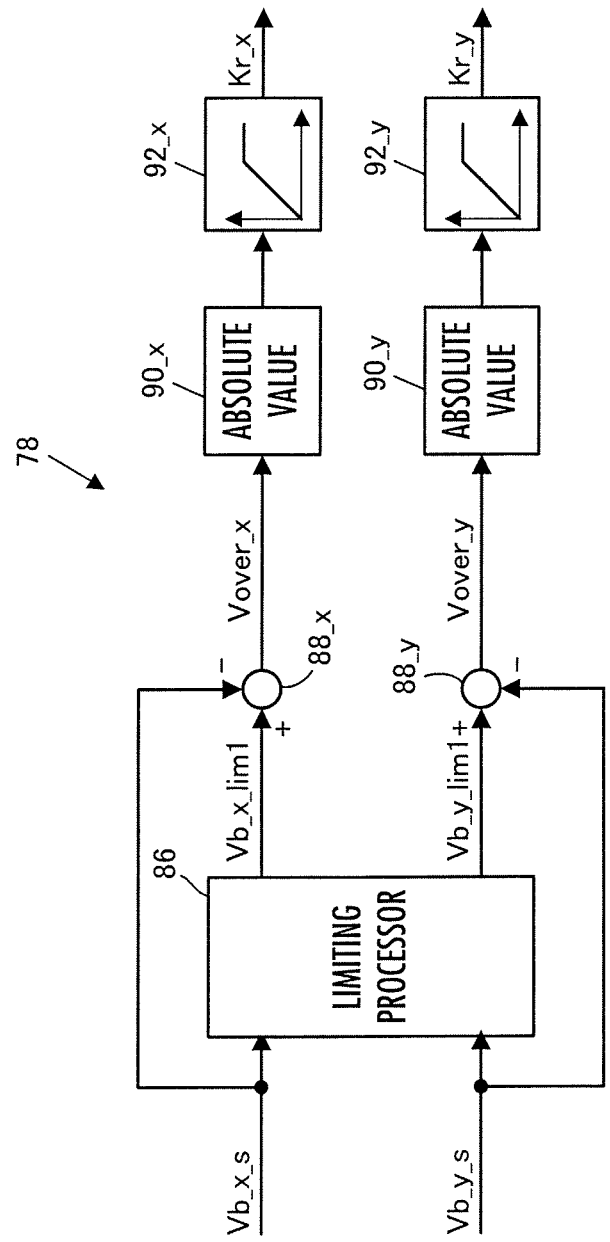
FIG. 10 is a block diagram illustrating a processing function of a gain adjusting element illustrated in FIG. 9.

As illustrated in FIG. 10, the gain adjustor 78 supplies the input estimated center-of-gravity velocity values Vb_x_s and Vb_y_s to a limiting processor 86. The limiting processor 86 adds, as appropriate, restrictions defined in consideration of the posture of the occupant when seated on the seat 3 to the estimated center-of-gravity velocity values Vb_x_s and Vb_y_s, thereby generating output values Vb_x_lim1 and Vb_y_lim1. The output value Vb_x_lim1 is a value obtained after limiting the moving velocity Vw_x of the imaginary wheel 62_x in the X-axis direction and the output value Vb_y_lim1 is a value obtained after limiting the moving velocity Vw_y of the imaginary wheel 62_y in the Y-axis direction.

The process performed by the limiting processor 86 will be described in further detail with reference to FIG. 11.

Figure 11:
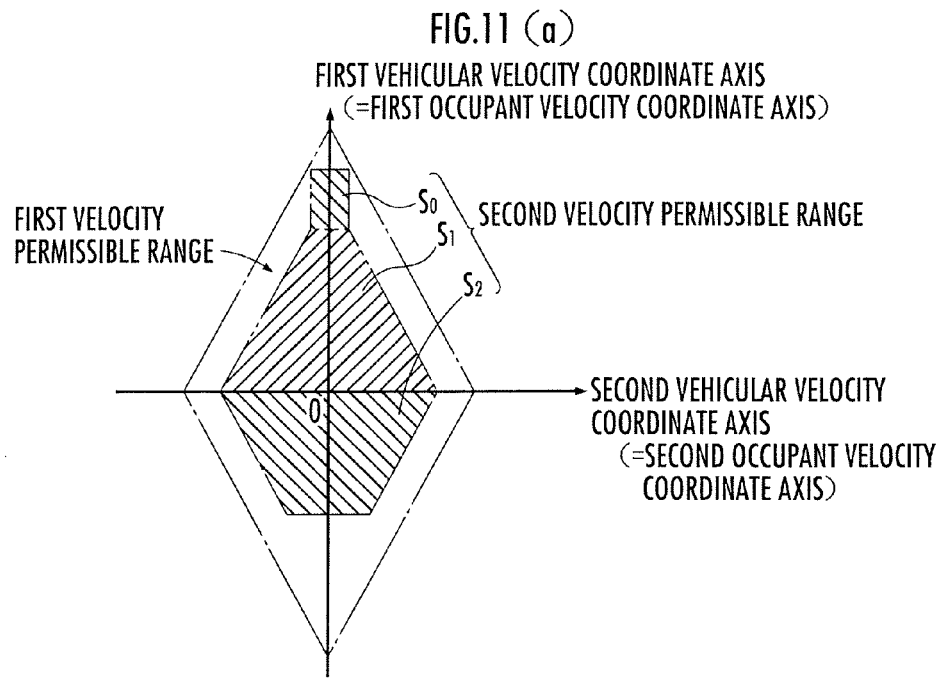
FIG. 11 is a diagram illustrating a processing function of a limiting processor illustrated in FIG. 10 (or a limiting processor illustrated in FIG. 12)
Figure 11:
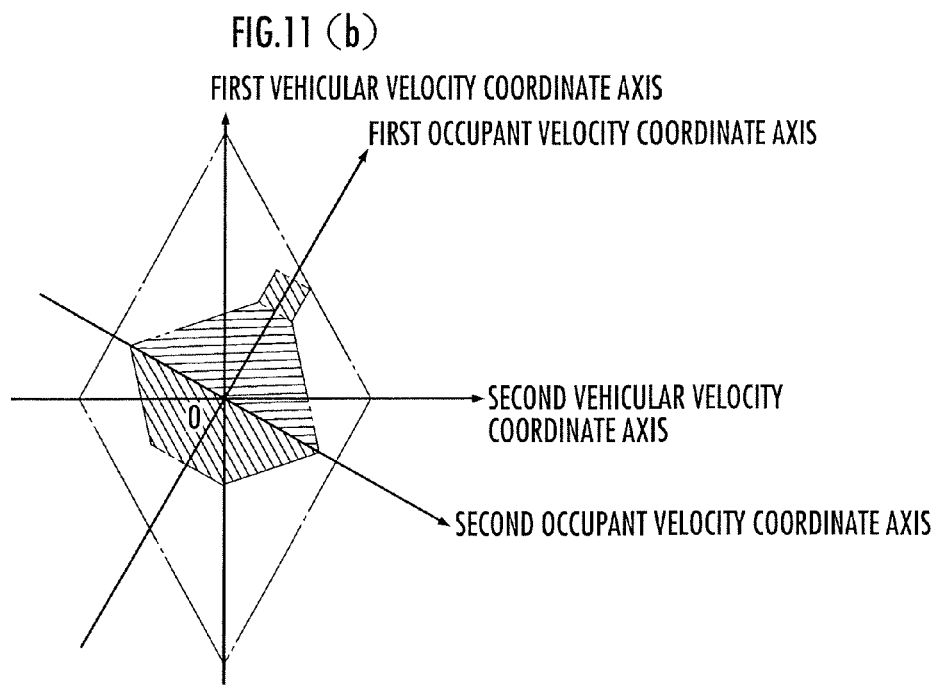

The estimated center-of-gravity velocity values Vb_x_s and Vb_y_s are restricted not to exceed a second velocity permissible range (equivalent to a velocity permissible range of the present invention) circumscribed by solid lines in FIG. 11(*a*) and FIG. 11(*b*). The second velocity permissible range is defined no to go beyond a first velocity permissible range circumscribed by dashed lines.

The first velocity permissible range is defined based on the permissible range of the rotational angular velocities ω_R and ω_L of the electric motors 31R and 31L, respectively, in the case where it is assumed that the moving velocity of the imaginary wheel 62_x in the X-axis direction coincides with the estimated center-of-gravity value Vb_x_s in the x-axis direction and the moving velocity of the imaginary wheel 62_y in the Y-axis direction coincides with the estimated center-of-gravity value Vb_y_s in the Y-axis direction.

The rotational angular velocities ωw_x of the imaginary wheel 62_x and ωw_y of the imaginary wheel 62_y are expressed by the expressions 01a and 01b, respectively, on the basis of the rotational angular velocities ω_R of the electric motor 31R and ω_L of the electric motor 31L. The center-of-gravity velocities Vb_x and Vb_y are expressed by a product of the rotational angular velocities ωw_x of the imaginary wheel 62_x and ωw_y of the imaginary wheel 62_y by the radius Rw_x of the imaginary wheel 62_x and the radius Rw_y of the imaginary wheel 62_y, respectively. Based on the above-mentioned relationships, the first velocity permissible range is defined to a diamond shape with the origin as the center point thereof in the vehicular velocity coordinate system, as illustrated in FIG. 11(*a*) and FIG. 11(*b*).

A forward velocity component (center-of-gravity velocity component in a first direction Vb_x>0) and a backward velocity component (center-of-gravity velocity component in the first direction Vb_x<0) of the vehicle 1 are expressed by a positive coordinate value and a negative coordinate value of a first vehicular velocity coordinate axis in the vehicular coordinate system, respectively. A leftward velocity component (center-of-gravity velocity component in a second direction Vb_y>0) and a rightward velocity component (center-of-gravity velocity component in the second direction Vb_y<0) of the vehicle 1 are expressed by a positive coordinate value and a negative coordinate value of a second vehicular velocity coordinate axis in the vehicular coordinate system, respectively.

The second velocity permissible range is defined on the basis of the posture of the occupant seated on the seat 3 with the riding quality sensed by the occupant taken into consideration. The second velocity permissible range is defined in an occupant velocity coordinate system. Each of the occupant velocity coordinate system and the vehicular velocity coordinate system has a rotational symmetry about their origin.

A forward translational velocity component and a backward translational velocity component of the occupant seated on the seat 3 are expressed by a positive coordinate value and a negative coordinate value of a first occupant velocity coordinate axis in the occupant coordinate system, respectively. A rightward velocity component and a leftward velocity component of the occupant are expressed by a positive coordinate value and a negative coordinate value of a second occupant velocity coordinate axis in the occupant coordinate system, respectively.

In the present embodiment, as illustrated in FIG. 11(*a*), the vehicle 1 is configured in such a way that the vehicular velocity coordinate system and the occupant velocity coordinate system agree with each other. Specifically, the vehicle 1 is configured so that the translation direction (first direction) along the fore-and-aft direction of the vehicle 1 agrees with the fore-and-aft direction of the occupant seated on the seat 3, and the translation direction (second direction) along the lateral direction of the vehicle 1 agrees with the lateral direction of the occupant. Additionally, it is acceptable to configure vehicle 1 that the two coordinate systems are different from each other as illustrated in FIG. 11(*b*).

As illustrated in FIG. 11(*a*) and FIG. 11(*b*), the second velocity permissible range is defined to have a tongue flap S0, a trapezoid S1 in the positive side and a trapezoid S2 in the negative side.

The trapezoid S1 in the positive side has a lower bottom side located on the second occupant velocity coordinate axis, the central point of the lower bottom side is in accord with the origin, and the position of an upper bottom side which is shorter than the lower bottom side, is represented by the positive coordinates of the first occupant velocity coordinate axis. The trapezoid S2 in the negative side takes the lower bottom side of the trapezoid S1 in the positive side as an upper bottom side, and a position of the lower bottom side, which is shorter than the upper bottom side, is represented by the negative coordinates of the first occupant velocity coordinate axis. The tongue flap S0 has a rectangular shape defined to have the upper bottom side of the trapezoid S1 in the positive side as a bottom side and extend toward the positive side (high velocity component side of the positive side of the first direction) of the first occupant velocity coordinate axis.

The second velocity permissible range illustrated in FIG. 11(*a*) and FIG. 11(*b*) has the following properties 01 to 03.

(Property 01)

The absolute value of the coordinate value of the first occupant velocity coordinate axis denoting the upper end position of the tongue flap S0 is greater than the absolute value of the coordinate value of the first occupant velocity coordinate axis denoting the lower bottom position of the trapezoid S2 in the negative side.

(Property 02)

In the trapezoid S1 in the positive side, the width in the direction parallel to the second occupant velocity coordinate axis decreases continuously as the absolute values of the positive coordinate values of the first occupant velocity coordinate axis increase. In the trapezoid S2 in the negative side, the width in the direction parallel to the second occupant velocity coordinate axis decreases continuously as the absolute values of the negative coordinate values of the first occupant velocity coordinate axis increase.

(Property 03)

The second velocity permissible range has symmetry about the first occupant velocity coordinate axis.

It is obvious from the properties 01 to 03 that the second velocity permissible range satisfies the following conditions 01 to 03.

(Condition 01)

The maximum absolute value of the positive coordinate values of the first occupant velocity coordinate axis is greater than the maximum absolute value of the negative coordinate values of the first occupant velocity coordinate axis.

(Condition 02)

In a region of at least a part of the coordinate values in the first occupant velocity coordinate axis, the width in the direction parallel to the second occupant velocity coordinate axis decreases continuously or discontinuously as the absolute values of the coordinate values in the first occupant velocity coordinate axis increase.

(Condition 03)

The second velocity permissible range is defined to have symmetry about the first occupant velocity coordinate axis.

The shape of the second velocity permissible range may be varied to satisfy at least a part of, preferably the entire part of the conditions 01 to 03.

For example, the second velocity permissible rang may be configured to be constructed by a triangle in the positive side which has a bottom side on the second occupant velocity coordinate axis and a vertex position represented by the positive coordinate values of the first occupant velocity coordinate axis, and a triangle in the negative side which has a bottom side in common with the bottom side of the triangle in the positive side, a vertex position represented by the negative coordinate value of the first occupant velocity coordinate axis and a height configured to be smaller than that of the triangle in the positive side. The second velocity permissible range may be configured to be constructed by an oval having a long axis agreeing to the first occupant velocity coordinate axis and the center position expressed by the positive coordinate value of the first occupant velocity coordinate axis.

It is acceptable for the second velocity permissible range to have the following property 04 in addition to the properties 01 to 03.

(Property 04)

In a region greater than a predefined value in the first occupant velocity coordinate axis (refer to the boundary line between the tongue S0 and the trapezoid S1 in FIG. 11), the width in the direction parallel to the second occupant velocity coordinate axis is a fixed value or decreases continuously or discontinuously (the tongue flap S0 diminishes continuously or discontinuously at the tip end) as the absolute values of coordinate values in the first occupant velocity coordinate axis increase; and meanwhile, in a region smaller than the predefined value but greater than zero in the first occupant velocity coordinate axis, the width in the direction parallel to the second occupant velocity coordinate axis is greater than the width at the predefined value in the first occupant velocity coordinate axis (the width of the trapezoid S1 in the direction of the second occupant velocity coordinate axis is wider than the width of the tongue flap S0 at the bottom in the direction of the second occupant velocity coordinate axis for an arbitrary first occupant velocity coordinate value).

In a situation where a velocity component of the vehicle 1 toward the front side of the occupant is greater than the predefined value, by defining the second velocity permissible range to have the property 04, the variation amount of the velocity component of the vehicle toward the lateral direction of the occupant is inhibited smaller, thereby, the stability of the vehicle 1 in translational moving can be maintained.

according to the process performed by the limiting processor 86 described above, if the estimated center-of-gravity velocity values Vb_x_s and Vb_y_s both fall within the second velocity permissible range, then, the pair of output values Vb_x_lim1 and Vb_y_lim1 coinciding with Vb_x_s and Vb_y_s respectively is output from the limiting processor 86.

On the other hand, if both or either one of the estimated center-of-gravity velocity values Vb_x_s and Vb_y_s deviates from the second velocity permissible range, after both or the either one of the estimated center-of-gravity velocity values are restricted forcibly in the second velocity permissible range, a pair of moving velocities Vb_x_lim1 and Vb_y_lim1 in the X-axis direction and Y-axis direction, respectively, is output from the limiting processor 86.

Thus, the limiting processor 86 generates the pair of output values Vb_x_lim1 and Vb_y_lim1 such that the output values Vb_x_lim1 and Vb_y_lim1 agree with Vb_x_s and Vb_y_s, respectively, as much as possible under an essential required condition that the pair of output values Vb_x_lim1 and Vb_y_lim1 coinciding with the estimated center-of-gravity velocity values Vb_x_s and Vb_y_s, respectively, do not deviate from the second velocity permissible range.

Referring back to the description of FIG. 10, the gain adjustor 78 then performs the process by calculators 88_x and 88_y. The calculator 88_x receives the estimated center-of-gravity velocity value in the X-axis direction Vb_x_s and the output value Vb_x_lim1 of the limiting processor 86. Then, the calculator 88_x calculates a value Vover_x obtained by subtracting Vb_x_s from Vb_x_lim1 and outputs the value Vover_x. Further, the calculator 88_y receives the estimated center-of-gravity velocity value in the Y-axis direction Vb_y_s and the output value Vb_y_lim1 of the limiting processor 86. Then, the calculator 88_y calculates a value Vover_y obtained by subtracting Vb_y_s from Vb_y_lim1 and outputs the value Vover_y.

If the output values Vb_x_lim1 and Vb_y_lim1 are not forcibly restricted in the limiting processor 86, then Vb_x_lim1=Vb_x_s and Vb_y_lim1=Vb_y_s. Therefore, the output values Vover_x and Vover_y of the calculators 88_x and 88_y, respectively, will be both zero.

On the other hand, if the output values Vb_x_lim1 and Vb_y_lim1 of the limiting processor 86 are generated by forcibly restricting the input values Vb_x_s and Vb_y_s, then a corrected amount from Vb_x_s of Vb_x_lim1 (=Vb_x_lim1−Vb_x_s) and a corrected amount from Vb_y_s of Vb_y_lim1 (=Vb_y_lim1−Vb_y_s) will be output from the calculators 88_x and 88_y, respectively.

Subsequently, the gain adjustor 78 passes the output value Vover_x of the calculator 88_x through processors 90_x and 92_x in this order thereby to determine the gain adjustment parameter Kr_x. Further, the gain adjustor 78 passes the output value Vover_y of the calculator 88_y through processors 90_y and 92_y in this order thereby to determine the gain adjustment parameter Kr_y. The gain adjustment parameters Kr_x and Kr_y both take values within the range from 0 to 1.

The processor 90_x calculates and outputs the absolute value of the input Vover_x. Further, the processor 92_x generates Kr_x such that the output value Kr_x monotonously increases relative to an input value |Vover_x| and has a saturation characteristic. The saturation characteristic means that if the input value increases to a certain level, then a change amount of an output value relative to an increase in the input value becomes zero or approaches to zero.

According to the present embodiment, if the input value |Vover_x| is a preset, predefined value or less, then the processor 92_x outputs, as Kr_x, a value obtained by multiplying the input value |Vover_x| by a proportionality coefficient of a predefined value. Further, if the input value |Vover_x| is larger than the predefined value, then the processor 92_x outputs 1 as Kr_x. The proportionality coefficient is set such that the product of |Vover_x| and the proportionality coefficient becomes 1 when |Vover_x| agrees with a predefined value.

The process performed by processors 90_y and 92_y is the same as that performed by the processors 90_x and 92_x, respectively, described above.

If the output values Vb_x_lim1 and Vb_y_lim1 in the limiting processor 86 are not forcibly restricted by the process performed by the gain adjustor 78 described above, that is, if the estimated center-of-gravity velocity values Vb_x_s and Vb_y_s fall within the second velocity permissible range, the first gain adjustment parameters Kr1_x and Kr1_y are both determined to be 0. Thus, generally, Kr1_x=Kr1_y=0.

On the other hand, if the output values Vb_x_lim1 and Vb_y_lim1 of the limiting processor 86 are generated by forcibly restricting the input values Vb_x_s and Vb_y_s, that is, if either one of the estimated center-of-gravity velocity values Vb_x_s and Vb_y_s deviates from the second velocity permissible range, then the values of the first gain adjustment parameters Kr1_x and Kr1_y are determined on the basis of the absolute values of the corrected amounts Vover_x and Vover_y, respectively. In this case, Kr_x is determined to be a larger value as the absolute value of the corrected amount Vover_x increases, the upper limit value thereof being 1. The same applies to Kr_y.

Figure 12:
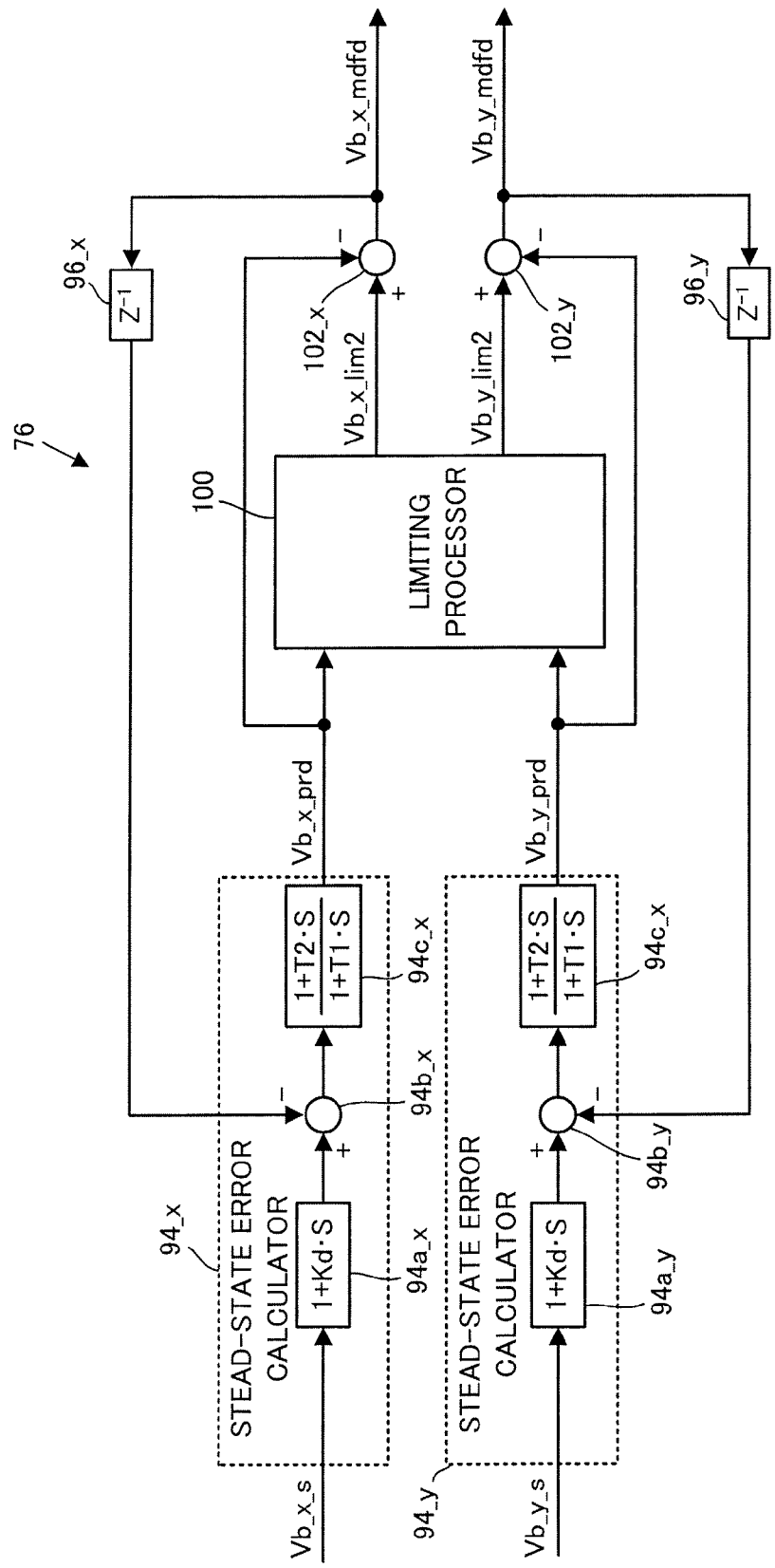
FIG. 12 is a block diagram illustrating a processing function of a center-of-gravity velocity restrictor 76 illustrated in FIG. 9.

The center-of-gravity velocity restrictor 76 receives the estimated center-of-gravity velocities Vb_xy_s (Vb_x_s and Vb_y_s) and performs the process illustrated by the block diagram of FIG. 12 by using the above input values so as to determine desired center-of-gravity velocities for control Vb_xy_mdfd (Vb_x_mdfd and Vb_y_mdfd).

Specifically, the center-of-gravity velocity restrictor 76 first performs the process by stead-state error calculators 94_x and 94_y.

In this case, the stead-state error calculator 94_x receives the estimated center-of-gravity velocity value in the X-axis direction Vb_x_s and also receives the previous value Vb_x_mdfd_p of the desired center-of-gravity velocity for control in the X-axis direction Vb_x_mdfd through the intermediary of a delay element 96_x. Then, in the stead-state error calculator 94_x, first, the input Vb_x_s is supplied to a proportional-differential compensation component (PD compensation component) 94a_x.

The proportional-differential compensation component 94_x is a compensation component whose transfer function is denoted by 1+Kd·S, and adds the input Vb_x_s and the value obtained by multiplying the differential value thereof (temporal change rate) by a coefficient Kd of a predefined value, and outputs the value resulting from the addition.

Subsequently, the stead-state error calculator 94_x calculates, by a calculator 94b_x, the value obtained by subtracting the input Vb_x_mdfd_p from the output value of the proportional-differential compensation component 94_x, then supplies the output value of the calculator 94b_x to a low-pass filter 94c_x having a phase compensation function.

The low-pass filter $94c\_x$ is a filter whose transfer function is denoted by $(1+T2\cdot S)/(1+T1\cdot S)$. Then, the stead-state error calculator $94\_x$ outputs the output value Vb_x_prd of the low-pass filter $94c\_x$.

The stead-state error calculator $94\_y$ receives the estimated center-of-gravity velocity value in the Y-axis direction Vb_y_s and also receives the previous value Vb_y_mdfd_p of the desired center-of-gravity velocity for control in the Y-axis direction Vb_y_mdfd through the intermediary of a delay element $96\_y$.

Then, similar to the stead-state error calculator $94\_x$ described above, the stead-state error calculator $94\_y$ performs the process by a proportional-differential compensation component $94a\_y$, a calculator $94b\_y$, and a low-pass filter $94c\_y$ in order and outputs an output value Vb_y_prd of the low-pass filter $94c\_y$.

Here, the output value Vb_x_prd of the stead-state error calculator $94\_x$ may be used as a stead-state error of a future estimated center-of-gravity velocity value in the X-axis direction presumed from a current motion state of the vehicle system center-of-gravity point observed from the Y-axis direction (in other words, the motion state of the mass point $60\_x$ of the inverted pendulum model observed from the Y-axis direction) relative to the desired center-of-gravity velocity for control Vb_x_mdfd of an expected convergence value. Similarly, the output value Vb_y_prd of the stead-state error calculator $94\_y$ may be used as a stead-state error of a future estimated center-of-gravity velocity value in the Y-axis direction presumed from a current motion state of the vehicle system center-of-gravity point observed from the X-axis direction (in other words, the motion state of the mass point $60\_y$ of the inverted pendulum model observed from the X-axis direction) relative to the desired center-of-gravity velocity for control Vb_y_mdfd of an expected convergence value. Hereinafter, the output values Vb_x_prd and Vb_y_prd of the stead-state error calculators $94\_x$ and $94\_y$, respectively, will be referred to as the predicted center-of-gravity velocity stead-state error values.

After performing the process by the stead-state error calculators $94\_x$ and $94\_y$ as described above, the center-of-gravity velocity restrictor 76 supplies the predicted center-of-gravity velocity steady-state error values Vb_x_prd and Vb_y_prd to a limiting processor 100. Then, the traveling velocities Vb_x_lim2 and Vb_y_lim2 are output from the limiting processor 100. The process by the limiting processor 100 is the same as the process by the limiting processor 86 of the gain adjustor 78 described above. In this case, as indicated by the reference characters in parenthesis in FIG. 11, only the input values and the output values of the individual processing sections of the limiting processor 100 are different from those of the limiting processor 86.

Similar to the limiting processor 86, according to the process performed by the limiting processor 100, the limiting processor 100 generates a pair of output values Vb_x_lim2 and Vb_y_lim2 such that the output values Vb_x_lim2 and Vb_y_lim2 agree with Vb_x_t and Vb_y_t, respectively, as much as possible under a required essential condition that the predicted center-of-gravity velocity steady-state error values Vb_x_prd and Vb_y_prd corresponding to the pair of the output values Vb_x_lim2 and Vb_y_lim2, respectively, do not deviate from the second velocity permissible range.

It is unnecessary for the second velocity permissible range in the limiting processor 100 to be the same as the second velocity permissible range in the limiting processor 86, and the permissible ranges may be different from each other.

Referring back to the description of FIG. 12, the center-of-gravity velocity restrictor 76 then performs the process by calculators $102\_x$ and $102\_y$ to calculate the desired center-of-gravity velocities for control Vb_x_mdfd and Vb_y_mdfd, respectively. Specifically, the calculator $102\_x$ calculates a value, which is obtained by subtracting the predicted center-of-gravity velocity stead-state error value in the X-axis direction Vb_x_prd from the output value Vb_x_lim2 of the limiting processor 100, as the desired center-of-gravity velocity for control in the X-axis direction Vb_x_mdfd. Similarly, the calculator $102\_y$ calculates a value, which is obtained by subtracting the predicted center-of-gravity velocity stead-state error value in the Y-axis direction Vb_y_prd from the output value Vb_y_lim2 of the limiting processor 100, as the desired center-of-gravity velocity for control in the Y-axis direction Vb_y_mdfd.

Regarding the desired center-of-gravity velocities for control Vb_x_mdfd and Vb_y_mdfd determined as described above, if the output values V_x_lim2 and V_y_lim2 are not forcibly restricted in the limiting processor 100, that is, if the predicted center-of-gravity velocity steady-state error values Vb_x_prd and Vb_y_prd fall within the second velocity permissible range, the desired center-of-gravity velocities for control Vb_x_mdfd and Vb_y_mdfd are both determined to be 0. Thus, generally, Vb_x_mdfd=Vb_y_mdfd=0.

On the other hand, if the output values Vb_x_lim2 and Vb_y_lim2 of the limiting processor 100 are generated by forcibly restricting the input values Vb_x_t and Vb_y_t, that is, if the predicted center-of-gravity velocity steady-state error values Vb_x_prd and Vb_y_prd deviate from the second velocity permissible range, then for the X-axis direction, a correction amount between the input value Vb_x_prd and the output value Vb_x_lim2 of the limiting processor 100 (=Vb_x_lim2−Vb_x_prd) is determined as the desired center-of-gravity velocity for control in the X-axis direction Vb_x_mdfd.

For the Y-axis direction, a correction amount between the input value Vb_y_prd and the output value Vb_y_lim2 of the limiting processor 100 (=Vb_y_lim2−Vb_y_prd) is determined as the desired center-of-gravity velocity for control in the Y-axis direction Vb_y_mdfd.

In this case, for example, regarding the velocity in the X-axis direction, the desired center-of-gravity velocity for control Vb_x_mdfd becomes a velocity in the opposite direction from the predicted center-of-gravity velocity steady-state error value in the X-axis direction Vb_x_prd output by the stead-state error calculator $94\_x$. The same applies to the velocity in the Y-axis direction.

The above has described the process by the center-of-gravity velocity restrictor 76.

Returning to the description of FIG. 9, after performing the processes by the center-of-gravity velocity restrictor 76, the gain adjustor 78, and the error calculator 70, respectively, as described above, the control unit 50 performs the process by the posture control calculator 80.

Figure 13:
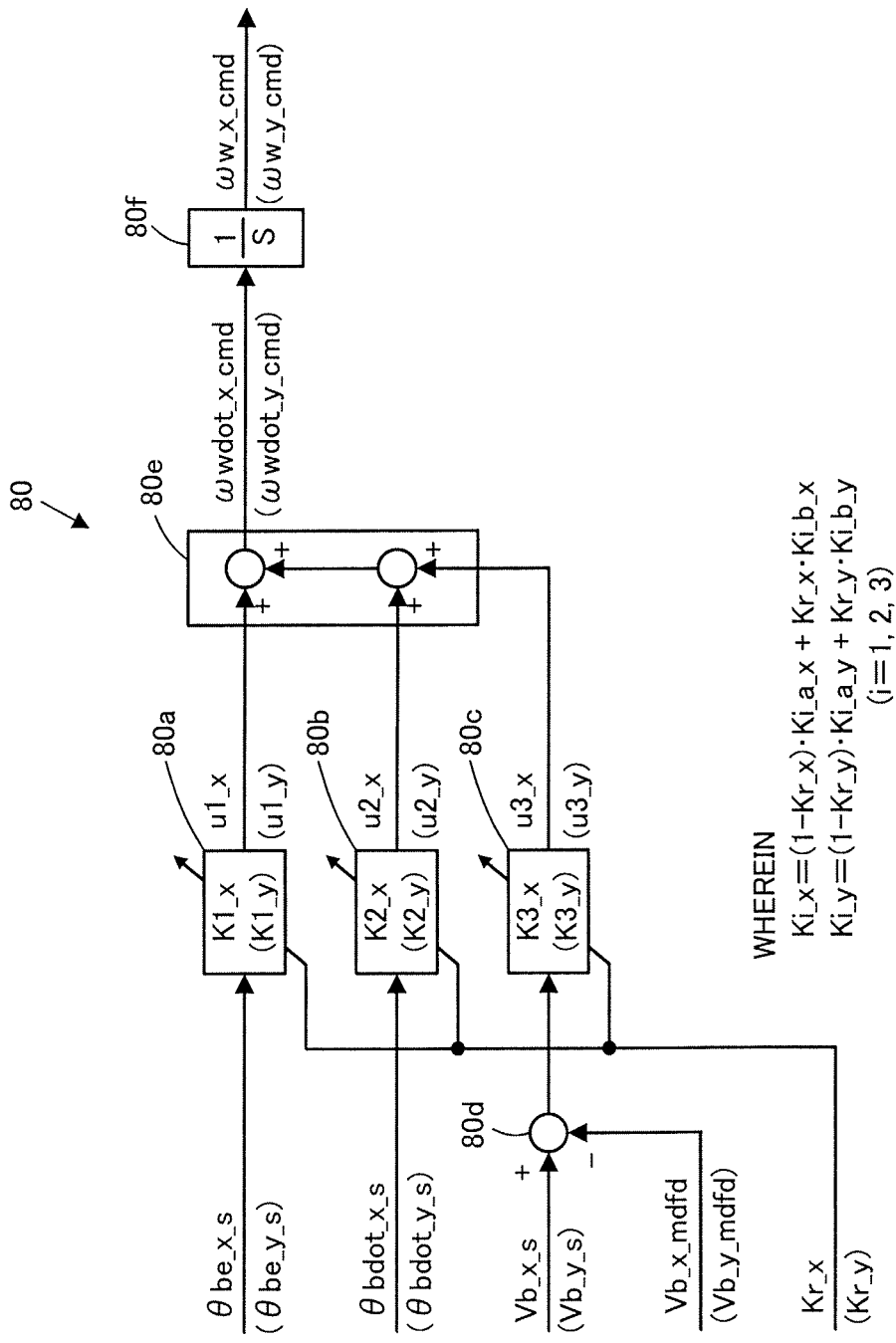
FIG. 13 is a block diagram illustrating a processing function of a posture control calculator 80 illustrated in FIG. 9.

The process by the posture control calculator 80 will be described below with reference to FIG. 13. The reference characters without parenthesis in FIG. 13 are the reference characters related to the processing for determining the imaginary wheel rotational angular velocity command ωw_x_cmd, which is the desired value of the rotational angular velocity of the imaginary wheel $62\_x$ circumrotating in the X-axis direction. The reference characters in parenthesis are the reference characters related to the processing for determining the imaginary wheel rotational angular velocity command ωw_y_cmd, which is the desired value of the rotational angular velocity of the imaginary wheel $62\_y$ circumrotating in the Y-axis direction.

The posture control calculator 80 receives the base body tilt angle error measured value θbe_xy_s calculated by the error calculator 70, the base body tilt angular velocity measured values θbdot_xy_s calculated in STEP2, the estimated center-of-gravity velocity values Vb_xy_s calculated by the center-of-gravity velocity calculator 72, the desired center-of-gravity velocities for control Vb_xy_mdfd calculated by the center-of-gravity velocity restrictor 76, and the gain adjustment parameters Kr_xy calculated by the gain adjustor 78.

Then, the posture control calculator 80 first calculates the imaginary wheel rotational angular acceleration commands ωwdot_xy_cmd according to the following expressions 07x and 07y by using the above received values.

$$\omega wdot\_x\_cmd = K1\_x \cdot \theta be\_x\_s + K2\_x \cdot \theta bdot\_x\_s + K3\_x \cdot (Vb\_x\_s - Vb\_x\_mdfd) \quad \text{Expression 07x}$$

$$\omega wdot\_y\_cmd = K1\_y \cdot \theta be\_y\_s + K2\_y \cdot \theta bdot\_y\_s + K3\_y \cdot (Vb\_y\_s - Vb\_y\_mdfd) \quad \text{Expression 07y}$$

Hence, according to the present embodiment, the imaginary wheel rotational angular acceleration command ωwdot_x_cmd denoting the manipulated variable (control input) for controlling the motion of the mass point 60_x of the inverted pendulum model observed from the Y-axis direction (i.e., the motion of the vehicle system center-of-gravity point observed from the Y-axis direction), and the imaginary wheel rotational angular acceleration command ωwdot_y_cmd denoting the manipulated variable (control input) for controlling the motion of the mass point 60_y of the inverted pendulum model observed from the X-axis direction (i.e., the motion of the vehicle system center-of-gravity point observed from the X-axis direction) are determined by adding up three manipulated variable components (the three terms of the right side of each of expressions 07x and 07y).

The gain coefficients K1_x, K2_x, and K3_x related to the manipulated variable components in expression 07x are variably set on the basis of the gain adjustment parameter Kr_x, while the gain coefficients K1_y, K2_y, and K3_y related to the manipulated variable components in expression 07y are variably set on the basis of the gain adjustment parameter Kr_y. Hereinafter, the gain coefficients K1_x, K2_x, and K3_x in expression 07x may be referred to as the first gain coefficient K1_x, the second gain coefficient K2_x, and the third gain coefficient K3_x, respectively. The same applies to the gain coefficients K1_y, K2_y, and K3_y in expression 07y.

An i-th gain coefficient Ki_x (i=1, 2, or 3) in the expression 07x and an i-th gain coefficient Ki_y (i=1, 2, or 3) in the expression 07y are determined on the basis of the gain adjustment parameters Kr_x and Kr_y according to expressions 09x and 09y given below, as indicated by the notations in FIG. 13.

$$Ki\_x = (1-Kr\_x) \cdot Ki\_a\_x + Kr\_x \cdot Ki\_b\_x \quad \text{Expression 09x}$$

$$Ki\_y = (1-Kr\_y) \cdot Ki\_a\_y + Kr\_y \cdot Ki\_b\_y \ (i=1, 2, 3) \quad \text{Expression 09y}$$

Wherein, Ki_a_x and Ki_b_x in the expression 09x denote constant values set preliminarily as the gain coefficient values on a minimum end (an end close to zero) of the i-th gain coefficient Ki_x and as the gain coefficient value on a maximum end (an end away from zero), respectively. The same applies to Ki_a_y and Ki_b_y in the expression 09y.

Thus, each i-th gain coefficient Ki_x (i=1, 2 or 3) used for the calculation in the expression 07x is determined as a weighted mean value of the constant values Ki_a_x and Ki_b_x corresponding thereto. Further, in this case, the weight applied to each of Ki_a_x and Ki_b_x is changed according to the gain adjustment parameter Kr_x. Therefore, if Kr_x=0, then Ki_x=Ki_a_x, and if Kr_x=1, then Ki_x=Ki_b_x. As Kr_x approaches from 0 to 1, the i-th gain coefficient Ki_x approaches from Ki_a_x to Ki_b_x.

Similarly, each i-th gain coefficient Ki_y (i=1, 2 or 3) used for the calculation in the expression 07y is determined as a weighted mean value of the constant values Ki_a_y and Ki_b_y corresponding thereto. Further, in this case, the weight applied to each of Ki_a_y and Ki_b_y is changed according to the gain adjustment parameter Kr_y. Therefore, as with the case of Ki_x, as the value of Kr_y changes from 0 to 1, the value of the i-th gain coefficient Ki_y changes between Ki_a_y and Ki_b_y.

As mentioned in the above, Kr_x and Kr_y are generally (specifically, the output values Vb_x_lim1 and Vb_y_lim1 are not forcibly restricted in the limit processor 86 of the gain adjustor 78) equal to zero. Therefore, generally, the i-th gain coefficients Ki_x=Ki_a_x and Ki_y=Ki_a_y (i=1, 2 or 3), respectively.

Supplementally, the constant values Ki_a_x, Ki_b_x and Ki_a_y, Ki_b_y (i=1, 2 or 3) are included in the constant parameters, the values of which are set in the STEP 6 or STEP 8.

The posture control calculator 80 uses the first to the third gain coefficients K1_x, K2_x, and K3_x determined as described above to perform the calculation of the above expression 07x, thereby calculating the imaginary wheel rotational angular acceleration command ωwdot_x_cmd related to the imaginary wheel 62_x circumrotating in the X-axis direction.

More specifically, referring to FIG. 13, the posture control calculator 80 calculates a manipulated variable component u1_x obtained by multiplying the base body tilt angle error measured value θbe_x_s by the first gain coefficient K1_x and a manipulated variable component u2_x obtained by multiplying the base body tilt angular velocity measured value θbdot_x_s by the second gain coefficient K2_x by processors 80a and 80b, respectively. Further, the posture control calculator 80 calculates the difference between the estimated center-of-gravity velocity value Vb_x_s and the desired center-of-gravity velocity for control Vb_x_mdfd (=Vb_x_s−Vb_x_mdfd) by a calculator 80d, and calculates, by a processor 80c, a manipulated variable component u3_x obtained by multiplying the calculated difference by the third gain coefficient K3_x. Then, the posture control calculator 80 adds up these manipulated variable components u1_x, u2_x, and u3_x by a calculator 80e so as to calculate the imaginary wheel rotational angular acceleration command ωwdot_x_cmd.

Similarly, the posture control calculator 80 performs the calculation according to the expression 07y by using the first to the third gain coefficients K1_y, K2_y, and K3_y determined as described above, thereby calculating the imaginary wheel rotational angular acceleration command ωwdot_y_cmd related to the imaginary wheel 62_y circumrotating in the Y-axis direction.

More specifically, the posture control calculator 80 calculates a manipulated variable component u1_y in the processor 80a by multiplying the base body tilt angle error measured value θbe_y_s by the first gain coefficient K1_y and a manipulated variable component u2_y in the processor 80b by multiplying the base body tilt angular velocity measured value θbdot_y_s by the second gain coefficient K2_y. Further, the posture control calculator 80 calculates the difference between the estimated center-of-gravity velocity value Vb_y_s and the desired center-of-gravity velocity for control Vb_y_mdfd (=Vb_y_s−Vb_y_mdfd) in the calculator 80d, and thereafter, calculates a manipulated variable component u3_y in the processor 80c by multiplying the calculated difference by the third gain coefficient K3_y. Then, the posture control calculator 80 adds up these manipulated variable components u1_y, u2_y, and u3_y in the calculator 80e so as to calculate the imaginary wheel rotational angular acceleration command ωwdot_x_cmd.

At the right side of the expression 07x, the first term (=the first manipulated variable component u1_x) and the second term (=the second manipulated variable component u2_x) denote the feedback manipulated variable components for converging the base body tilt angle error measured value θbe_x_s in the direction about the X-axis to zero (converging the base body tilt angle measured value θb_x_s to the desired value θb_x_obj) by the PD law (proportional-differential law) serving as the feedback control law.

Further, at the right side of the expression 07x, the third term (=the third manipulated variable component u3_x) denotes a feedback manipulated variable component for converging the difference between the estimated center-of-gravity velocity value Vb_x_s and the desired center-of-gravity velocity for control Vb_x_mdfd to zero (converging Vb_x_s to Vb_x_mdfd) by a proportional law serving as the feedback control law.

The same applies to the first to the third terms (the first to the third manipulated variable components u1_y, u2_y, and u3_y) of the right side of the expression 07y.

As mentioned in the above, generally (specifically, the output values V_x_lim2 and V_y_lim2 are not forcibly restricted in the limiting processor 100 of the center-of-gravity velocity restrictor 76), the desired center-of-gravity velocities for control Vb_x_mdfd and Vb_y_mdfd are equal to 0. If Vb_x_mdfd=Vb_y_mdfd=0 in common, then the third manipulated variable components u3_x and u3_y are equal to the values obtained by multiplying the estimated center-of-gravity velocity values Vb_x_s and Vb_y_s by the third gain coefficients K3_x and K3_y, respectively.

After the calculation of the imaginary wheel rotational angular acceleration commands ωwdotx_cmd and ωwdot_y_cmd as described above, the posture control calculator 80 integrates the ωwdot_x_cmd and ωwdot_y_cmd by an integrator 80f thereby to determine the imaginary wheel rotational velocity commands ωw_x_cmd and ωw_y_cmd.

The above has described the details of the process performed by the posture control calculator 80.

Supplementally, the imaginary wheel rotational angular acceleration command ωwdot_x_cmd may alternatively be calculated by an expression wherein the third term of the right side of the expression 07x is separated into the manipulated variable component based on Vb_x_s (=K3_x·Vb_x_s) and the manipulated variable component based on Vb_x_mdfd (=−K3_x·Vb_x_mdfd). Similarly, the imaginary wheel rotational angular acceleration command ωwdot_y_cmd may alternatively be calculated by an expression wherein the third term of the right side of expression 07y is separated into the manipulated variable component based on Vb_y_s (=K3_y·Vb_y_s) and the manipulated variable component based on Vb_y_mdfd (=−K3_y·Vb_y_mdfd).

Further, in the present embodiment, the rotational angular acceleration commands ωw_x_cmd and ωw_y_cmd of the imaginary wheels 62_x and 62_y have been used as the manipulated variables (control inputs) for controlling the behaviors of the vehicle system center-of-gravity point. However, for example, the drive torques of the imaginary wheels 62_x and 62_y or the translational forces obtained by dividing the driving torques by the radii Rw_x and Rw_y of the imaginary wheels 62_x and 62_y (i.e., the frictional forces between the imaginary wheels 62_x, 62_y and a floor surface) may be used as the manipulated variables.

Returning to the description of FIG. 9, the control unit 50 then supplies the imaginary wheel rotational velocity commands χw_x_cmd and χw_y_cmd determined as described above by the posture control calculator 80 to the motor command calculator 82, and performs the processing by the motor command calculator 82 so as to determine a velocity command χ_R_cmd of the electric motor 31R and a velocity command χ_L_cmd of the electric motor 31L.

To be more specific, the motor command calculator 82 determines the velocity commands ω_R_cmd and ω_L_cmd of the electric motors 31R and 31L by solving a simultaneous equation obtained by replacing ωw_x, ωw_y, ω_R and ω_L of the abovementioned expressions 01a and 01b by ωw_x_cmd, ωw_y_cmd, ω_R_cmd and ω_L_cmd, respectively, with the ω_R_cmd and ω_L_cmd serving as unknowns.

Thus, the vehicle control arithmetic process in the STEP 9 is completed.

As described above, according to the control arithmetic process carried out by the control unit 50, in either the operation mode of the boarding mode or the operation mode of the autonomous mode, basically, in a state where the posture of the seat 3 and the base body 9 is maintained at a posture in which the base body tilt angle error measured value θbe_x_s and θbe_y_s are both zero (hereinafter, this posture will be referred to as the basic posture), the imaginary wheel rotational angular acceleration commands ωwdot_xy_cmd are determined as the manipulated variables (control inputs) to maintain the vehicle system center-of-gravity point stationary. If the posture of the seat 3 and the base body 9 tilts with respect to the basic posture, in other words, the position of the vehicle system center-of-gravity point (the vehicle-occupant overall center-of-gravity point or the vehicle-alone center-of-gravity point) in the lateral direction is displaced from the state of being positioned substantially right above the ground contact surface of the wheel assembly 5, the imaginary wheel rotational angular acceleration commands ωwdot_xy_cmd are determined so as to restore the posture of the seat 3 and the base body 9 to the basic posture (to approximate θbe_x_s and θbe_y_s to zero or maintain at zero).

Then, the rotational angular velocities of the electric motors 31R and 31L, respectively, obtained by converting the imaginary wheel rotational angular velocity commands ωw_xy_cmd, which is obtained by integrating each component of ωwdot_xy_cmd, are determined as the velocity commands ω_R_cmd and ω_L_cmd of the electric motors 31R and 31L. Further, the rotational velocities of the electric motors 31R and 31L are controlled according to the velocity commands ω_R_cmd and ω_L_cmd. Thus, the moving velocities of the wheel assembly 5 in the X-axis direction and the Y-axis direction, respectively, are controlled so as to agree with the moving velocity of the imaginary wheel 62_x corresponding to ωw_x_cmd and the moving velocity of the imaginary wheel 62_y corresponding to ωw_y_cmd, respectively.

Accordingly, if, for example, the actual base body tilt angle θb_x deviates from the desired value θb_x_obj in the direction about the Y-axis by leaning forward, then the wheel assembly 5 moves forward to eliminate the deviation (to converge θbe_x_s to zero). Similarly, if the actual θb_x deviates from the desired value θb_x_obj by leaning backward, then the wheel assembly 5 moves backward to eliminate the deviation (to converge θbe_x_s to zero).

If, for example, the actual base body tilt angle θb_y deviates from the desired value θb_y_obj in the direction about the X-axis by leaning rightward, then the wheel assembly 5 moves rightward to eliminate the deviation (to converge θbe_y_s to zero). Similarly, if the actual θb_y deviates from the desired value θb_y_obj by leaning leftward, then the wheel assembly 5 moves leftward to eliminate the deviation (to converge θbe_y_s to zero).

If both the actual base body tilt angles θb_x and θb_y deviate from the desired values θb_x_obj and θb_y_obj, respectively, then the moving operation of the wheel assembly 5 in the fore-and-aft direction to eliminate the deviation of θb_x and the moving operation of the wheel assembly 5 in the lateral direction to eliminate the deviation of θb_y are combined, so that the wheel assembly 5 will move in a direction combining the X-axis direction and the Y-axis direction (a direction at an angle to both the X-axis direction and the Y-axis direction).

Thus, if the posture of the seat 3 and the base body 9 tilts from the basic posture, then the wheel assembly 5 moves toward the tilted side. Hence, if, for example, the occupant intentionally inclines his/her upper body together with the seat 3 and the base body 9 in the boarding mode, then the wheel assembly 5 moves to the tilted side. It should be noted that in the present embodiment, due to the reasons to be described hereinafter, when the seat 3 and the base body 9 are tilted from the basic body, the moving direction of the vehicle system center-of-gravity point in the horizontal plane (moving direction orthogonal to the Z axis) may not always agree to the moving direction of the wheel assembly 5.

When the wheel assembly 5 is moving (the entire vehicle 1 is moving), if the posture of the seat 3 and the base body 9 is maintained at a constant posture (where the base body tilt angle error measured value θbe_xy_s is constant) tilted from the basic posture, the travelling velocity of the vehicle system center-of-gravity point (and consequently the travelling velocity of the wheel assembly 5) is converged to have a constant difference from the desired center-of-gravity velocity for control Vb_xy_mdfd and the difference is dependent on the base body tilt angle error measured value θbe_xy_s.

In the present embodiment, if the travelling motion of the wheel assembly 5 is normally performed in a moving velocity when the rotational angular velocities of the electric motors 31R and 31L are not excessively high (more precisely, if the output values Vb_x_lim2 and Vb_y_lim2 are not forcibly restricted in the limiting processor 100 of the center-of-gravity velocity restrictor 76), the desired center-of-gravity velocities for control Vb_x_mdfd and Vb_y_mdfd are both maintained at zero. When the Vb_x_mdfd and Vb_y_mdfd are being maintained constant, if the posture of the seat 3 and the base body 9 is maintained at a constant posture tilted from the basic posture, the travelling velocity of the vehicle system center-of-gravity point (and consequently the travelling velocity of the wheel assembly 5) is converged to a traveling velocity having a magnitude and direction dependent on the base body tilt angle error measured value θbe_xy_s.

The above operations will be described in further detail hereinafter. In the stationary state where the base body tilt angle error measured values θbe_x_s and θbe_y_s are both maintained constant, the second manipulated variable components u2_x and u2_y become equal to zero. Thus, the imaginary wheel rotational angular acceleration command ωwdot_x_cmd is equal to the result of adding up the first manipulated variable component u1_x and the third manipulated variable component u3_x, and the imaginary wheel rotational angular acceleration command ωwdot_y_cmd is equal to the result of adding up the first manipulated variable component u1_y and the third manipulated variable component u3_y.

In the stationary state, the imaginary wheel rotational angular acceleration commands ωwdot_x_cmd and ωwdot_x_cmd converge to a value which could maintain the travelling velocity of the wheel assembly 5 constant, and consequently, the center-of-gravity velocities Vb_x and Vb_y converge to a fixed value.

In this case, the second term (=u2_x) at the right side of the expression 07x becomes zero and the first term (=u1_x= K1_x·θbe_x_s) is a fixed value, which makes ωwdot_x_cmd at the left side equal to a fixed value, the convergence value of the center-of-gravity velocity Vb_x in the X-axis direction (the convergence value of the estimated center-of-gravity velocity Vb_x_s which will be referred to as a stationary-state converging velocity Vb_x_stb) becomes dependent on the base body tilt angle error measured value θbe_x_s about the Y-axis direction. More specifically, Vb_x_stb= (−K1_x·Δθbe_x_s+ωdotw_x_cmd)/K3_x+Vb_x_mdfd, thus, Vb_x_stb is a function value varying monotonically with θbe_x_s.

Similarly, the second term (=u2_y) at the right side of the expression 07y becomes zero and the first term (=u1_y= K1_y·θbe_y_s) at the right side is a fixed value, which makes ωwdot_y_cmd at the left side equal to a fixed value, the convergence value of the center-of-gravity velocity Vb_x in the Y-axis direction (the convergence value of the estimated center-of-gravity velocity Vb_y_s which will be referred to as a stationary-state converging velocity Vb_y_stb) becomes dependent on the base body tilt angle error measured value θbe_y_s about the X-axis direction. More specifically, Vb_y_stb=(−K1_y·Δθbe_y_s+ωwdot_y_cmd)/K3_y+ Vb_y_mdfd, thus, Vb_y_stb is a function value varying monotonically with θbe_y_s.

When the Vb_x_mdfd and Vb_y_mdfd are being maintained constantly, if the posture of the seat 3 and the base body 9 is maintained at a constant posture tilted from the basic posture, the travelling velocity of the vehicle system center-of-gravity point (and consequently the travelling velocity of the wheel assembly 5) is converged to a traveling velocity having a magnitude and direction dependent on the base body tilt angle error measured value θbe_xy_s.

For example, if the amount of the tilt of the base body 9 and the seat 3 from the basic posture (the base body tilt angle error measured values θbe_x_s and θbe_y_s) becomes relatively large, and the moving velocity or velocities of the wheel assembly 5 in one or both of the X-axis direction and the Y-axis direction for maintaining the tilt amount (these moving velocities corresponding to the predicted center-of-gravity velocity stead-state error values Vb_x_prd and Vb_y_prd, respectively, shown in FIG. 12) are an excessively large moving velocity or velocities that would make one or both of the rotational angular velocities of the electric motor 3R and 3L deviate from the second velocity permissible range in the limiting processor 100, then velocities in the opposite direction to the moving velocity of the wheel assembly 5 (specifically, Vb_x_lim2−Vb_x_prd and Vb_y_lim2−Vb_y_prd) will be determined as the desired center-of-gravity velocities for control Vb_x_mdfd and Vb_y_mdfd. Then, the third manipulated variable components u3_x and u3_y among the manipulated variable components constituting a control input are determined such that the estimated center-of-gravity velocity values Vb_x_s and Vb_y_s will be converged to the desired center-of-gravity velocities for control Vb_x_mdfd and Vb_y_mdfd, respectively. This prevents the velocity of the wheel assembly 5 from increasing, thus preventing the rotational angular velocity or velocities of one or both of the electric motors 31R and 31L from becoming excessively high.

Further, in the gain adjustor 78, in the situation where one or both of the estimated center-of-gravity velocity values Vb_x_s and Vb_y_s become large, and the moving velocity or velocities of the wheel assembly 5 in one or both of the X-axis direction and the Y-axis direction may become an excessively large moving velocity that would deviate from the second velocity permissible range in the limiting processor 86, as the deviation becomes more notable (more specifically, as the absolute values of Vover_x and Vover_y shown in FIG. 12 increase), one or both of the first gain adjustment parameters Kr1_x and Kr1_y are brought closer to 1 from 0.

In this case, each i-th gain coefficient Ki_x (i=1, 2 or 3) calculated according to the expression 09x approaches to Ki_b_x·Ki_x_2 from Ki_a_x·Ki_x_2 as Kr1_x approaches to 1. Consequently, the absolute value of Ki_x becomes large. The same applies to each i-th gain coefficient Ki_y (i=1, 2 or 3) calculated according to the expression 09y.

As the absolute values of the gain coefficients increase, the sensitivities of the manipulated variables (the imaginary wheel rotational angular acceleration commands ωdotw_x_cmd and ωdotw_y_cmd) in response to a change in the tilt of the seat 3 and the base body 9 (change in the base body tilt angle error measured value θbe_xy_s) or a change in the estimated center-of-gravity velocity value Vb_xy_s increase. Hence, the moment the amount of a tilt of the base body 9 and the seat 3 from the basic posture or a magnitude of the estimated center-of-gravity velocity value Vb_xy_s indicates an increment, the moving velocity of the wheel assembly 5 will be controlled to immediately eliminate the increment. This intensely restrains the base body 9 from considerably tilting from the basic posture or the estimated center-of-gravity velocity value Vb_xy_s from becoming considerably large, thus making it possible to prevent the moving velocity or velocities of the wheel assembly 5 in one or both of the X-axis direction and the Y-axis direction from becoming an excessively high moving velocity that causes moving velocity or velocities of the wheel assembly 5 in one or both of the X-axis direction and the Y-axis direction to deviate from the second velocity permissible range in the limiting processor 86.

Effects of the Present Invention

According to the inverted pendulum type vehicle of the present invention, the motion of the vehicle 1 is controlled according to the velocity anisotropy, namely the maximum travelling velocities are different in different travelling directions (refer to FIG. 11(*a*) and FIG. 11(*b*)). The velocity anisotropy may be set to fit the riding quality anisotropy which means that the riding quality sensed by the occupant boarding the vehicle is different in different translational directions even though the translational velocities are identical. Thus, in a direction where it is easy for the occupant to have an uncomfortable feeling when the translational velocity becomes higher, the vehicle 1 is prevented from moving in a situation where the excessively high travelling velocity or the like of the vehicle 1 may deteriorate the riding quality of the occupant in a high possibility. Consequently, the vehicle 1 can move in an appropriate mode in view of the riding quality of the occupant.

Specifically, by defining the second velocity permissible range to satisfying the condition 01, the maximum velocity component toward the same direction as the back side of the occupant at the time when the occupant is boarding the seat 3 (the payload supporting part) is restricted lower than the maximum velocity component toward the same direction as the front side of the occupant. According thereto, in consideration of the fact that compared with the translation toward the front side, the translation toward the back side will make it more difficult for the occupant to cast the visual field on the translational direction toward the back side or easier for the occupant to have an uncomfortable feeling even though the translational velocities are identical, the motion of the vehicle 1 can be controlled in an appropriate manner without deteriorating the riding quality of the occupant.

Further, by defining the second velocity permissible range to satisfying the condition 02, the vehicle 1 may move in such a manner that the maximum velocity component of the vehicle 1 toward the lateral direction of the occupant decreases as the travelling velocity component of the vehicle 1 toward the front side or the back side of the occupant increases. According thereto, when a velocity component of the vehicle 1 has changed in the fore-and-aft direction of the occupant, the velocity of the vehicle 1 can be prevented from varying remarkably. Thereby, the vehicle 1 can be prevented from moving in a manner to deteriorate the riding quality of the occupant. Moreover, since the variation amount on the velocity components of the vehicle 1 to the lateral direction of the occupant is restricted smaller in a situation where the velocity components of the vehicle 1 in the fore-and-aft direction of the occupant are relatively high, it is possible to maintain the travelling stability (translational stability) of the vehicle 1.

Furthermore, by defining the second velocity permissible range to satisfying the condition 03, since the maximum velocity component toward either side in the lateral direction of the occupant is different from the maximum velocity component toward the other side (since the maximum velocity components in the lateral direction of the vehicle 1 are asymmetrical), it is possible to prevent the riding quality from being deteriorated.

Another Embodiment of the Present Invention

Some modifications related to the embodiments described above will now be described.

It is acceptable to set the third gain coefficients K3_y as a function of the absolute values of the representative point velocities (the absolute values of the center-of-gravity velocities) |Vb_x|. As illustrated by a chain line in FIG. 14, the function may have a characteristic, for example, the increasing rate becomes greater discontinuously as the absolute values of the representative point velocities increase in a region smaller than the absolute value of the boundary values of the second velocity permissible range. Specifically, as illustrated by the chain line in FIG. 14, the function has the following characteristic: as the absolute value of the representative point velocity |Vb_x| increase from the origin O to a reference value smaller than the absolute value of the boundary value |Vb_x_lim| of the second velocity permissible range in the X-axis direction, the function increases from the origin O in proportion to a coefficient C_x1 (>0); as the absolute value of the representative point velocity |Vb_x| increase from the reference value, the function increases in proportion to a coefficient C_2 greater than the coefficient C_1.

Figure 14:
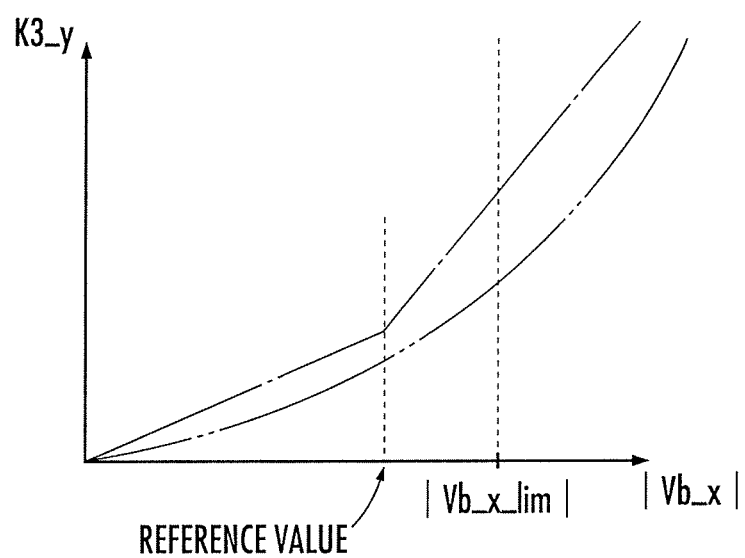
FIG. 14 is an explanatory diagram related to a setting method of a gain coefficient.

It is acceptable that the function has a characteristic that the increasing rate becomes greater continuously as the absolute values of the representative point velocities increase in a region smaller than the absolute value of the boundary values of the second velocity permissible range, as illustrated by a two-dot chain line in FIG. 14.

According to the vehicle 1 having the above-mentioned configuration, if the absolute value |Vb_x| of the representative point velocity in the first direction (X-axis direction) increases, the operation of the actuator 7 is controlled so as to decrease the representative point velocity Vb_y in the second direction (Y-axis direction) generated when the occupant of vehicle 1 moves the center of gravity thereof toward the second direction. According thereto, when the representative point of the vehicle 1 is moving in the first direction, the deviation of the representative point of the vehicle 1 toward the second direction caused by the deviation of the center of gravity of the occupant toward the second direction is inhibited, and consequently, the travelling stability of the vehicle 1 may be maintained.

If the absolute value |Vb_x| of the representative point velocity in the first direction (X-axis direction) increases, the operation of the actuator 7 is controlled so as to increase a ratio of a change in either a velocity or an acceleration of the travelling motion unit 5 in the second direction (Y-axis direction) with respect to a change in the representative point velocity Vb_y in the second direction. According thereto, when the representative point of the vehicle 1 is moving in the first direction, the deviation of the representative point of the vehicle 1 toward the second direction is inhibited, and consequently, the travelling stability of the vehicle 1 may be maintained.

Particularly, from a state when the representative point velocity Vb_x in the first direction is in a range within the permissible range, the actuator 7 is controlled so that the ratio of the change in either the velocity or the acceleration of the travelling motion unit 5 in the second direction with respect to the change in the representative point velocity Vb_x in the first direction increases by small portions (refer to the reference point in FIG. 14). According thereto, the travelling state can be prevented from becoming unstable due to the abrupt increasing of the ratio as soon as the representative point velocity Vb_x in the first direction exceeds the permissible range. As a result thereof, when the representative point of the vehicle 1 is moving in the first direction, the deviation of the representative point of the vehicle 1 toward the second direction is inhibited, and consequently, the travelling stability of the vehicle 1 may be maintained.

(1) In place of the base body tilt angle measured value θb_xy_s, it is acceptable to include a component obtained by multiplying the difference between a predicted value thereof in the future and the base body tilt angle desired value θb_xy_obj by the first gain coefficient K1_xy in the manipulated variable ωwdot_xy_cmd or ωw_xy_cmd. The predicted value may be calculated by the same method as that used to calculate the predicted center-of-gravity velocity stead-state error value Vb_xy_prd (refer to the stead-state error calculator in FIG. 12).

(2) In place of the base body tilt angle measured value θb_xy_s, it is acceptable to include a component obtained by multiplying the difference between a predicted value thereof in the future and the base body tilt angle desired value θb_xy_obj by the second gain coefficient K2_xy in the manipulated variable ωwdot_xy_cmd or ωw_xy_cmd. The predicted value may be calculated by the same method as that used to calculate the predicted center-of-gravity velocity stead-state error value Vb_xy_prd (refer to the stead-state error calculator in FIG. 12).

(3) In place of the estimated center-of-gravity velocity value Vb_xy_s, it is acceptable to include a component obtained by multiplying the difference between a predicted value thereof in the future, namely the predicted center-of-gravity velocity stead-state error value Vb_xy_prd and the desired center-of-gravity velocity Vb_xy_mdfd by the first gain coefficient K1_xy in the manipulated variable ωwdot_xy_cmd or ωw_xy_cmd.

In the above-mentioned embodiments, it is described that the vehicle system center-of-gravity point (more accurately, the overall vehicle-occupant center-of-gravity point) is equivalent to the predefined representative point of the vehicle 1; however, it is acceptable to set the predefined representative point as the central point of the wheel assembly 5, a point in a predefined portion (for example the support frame 13) of the base body 9 or the like.

In the above-mentioned embodiments, the gain coefficients K1_x, K3_x, K1_y and K3_y are determined in such a way that |K3_x|/|K1_x|<|K3_y|/|K1_y|. However, in the present embodiment, if the rotation angular velocity of one or both of the electric motors 31R and 31L is not excessively high, that is to say, in a normal state (specifically, if the output values Vb_x_lim1 and Vb_y_lim1 are not forcibly restricted in the limiting processor 86 in the gain adjustor 78), then the gain coefficients K1_x, K3_x, K1_y and K3_y are equal to the constants K1_a_x, K3_a_x, K1_a_y and K3_a_y, respectively. Thus, for example, only in the normal state, it is acceptable to set |K3_x|/|K1_x|<|K3_y|/|K1_y|, and consequently, |Vb_x_stb|/|θb_x_stb|>|Vb_y_stb|/|θb_y_stb|. In this case, it is acceptable to set the constants K1_a_x, K3_a_x, K1_a_y and K3_a_y so that |K3_a_x|/|K1_a_x|<|K3_a_y|/|K1_a_y|.

Further, it is acceptable to appropriately determine the gain coefficients K1_x, K3_x, K1_y and K3_y in such a way that |K3_x|/|K1_x|>|K3_y|/|K1_y| opposite to the above according to the operation conditions or environments of the vehicle, the switch operation by the occupant or the like. Accordingly, when the vehicle is made to move in the Y-axis direction, the irregular variation on the moving direction of the wheel assembly 5 with respect to the Y-axis direction can be inhibited.

In the above-mentioned embodiments, the gain coefficient Ki_xy (i=1, 2, 3) is modified appropriately according to the gain adjusting parameter Kr_xy; however, it is acceptable to maintain the gain coefficient Ki_xy (i=1, 2, 3) constant in one or both of the boarding mode and the autonomous mode. If the gain coefficient Ki_xy (i=1, 2, 3) is maintained constant, the process by the gain adjuster 78 is unnecessary.

In the abovementioned embodiments, the vehicle 1 illustrated in FIG. 1 and FIG. 2 is given as an example; however, the inverted pendulum type vehicle 1 according to the present invention is not limited to the vehicle described in the above-mentioned embodiments.

Specifically, the wheel assembly 5 serving as the traveling motion unit of the vehicle 1 in the present embodiment has the one-piece construction. Alternatively, however, the wheel assembly 5 may have a construction shown in, for example, FIG. 10 of the Patent Document 3. More specifically, the wheel assembly may be constructed to have a rigid annular shaft member and a plurality of rollers rotatively and externally inserted into the rigid annular shaft member such that the axial centers thereof are oriented in the tangential direction of the shaft member, the plurality of these rollers being arranged in the circumferential direction along the shaft member.

It is acceptable that the traveling motion unit may have a crawler-shaped structure, as shown in, for example, FIG. 3 of the Patent Document 2.

Figure 5:
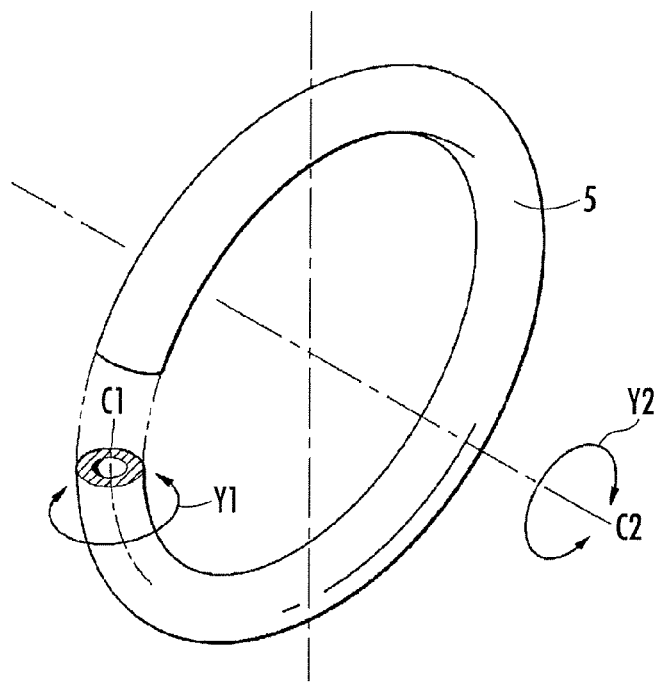
FIG. 5 is a perspective view of a traveling motion unit (wheel assembly) of the inverted pendulum type vehicle according to the embodiment.

Alternatively as shown, for example, in FIG. 5 of the Patent Document 2, FIG. 7 of the Patent Document 3, or FIG. 1 of the Patent Document 1, the traveling motion unit may be constructed of a spherical member, and the vehicle may be constructed such that the spherical member is rotatively driven in a direction about the X-axis and a direction about the Y-axis by an actuator (e.g., an actuator having the wheel assembly 5).

Further, in the present embodiment, the vehicle 1 provided with the seat 3 as the boarding section for an occupant has been exemplified. Alternatively, however, the inverted pendulum type vehicle according to the present invention may be a vehicle having a construction wherein a step on which an occupant rests his/her both feet and a section to be gripped by the occupant standing on the step are mounted on a base body, as illustrated in, for example, FIG. 8 in Patent Document 3.

Thus, the present invention can be applied to inverted pendulum type vehicles of various constructions, as illustrated in the Patent Documents 1 to 3 and the like.

Further, the inverted pendulum type vehicle according to the present invention may be configured to have a plurality of traveling motion units capable of moving in all directions on a floor surface (e.g., two in the lateral direction, or two in the fore-and-aft direction, or three or more).

Further, in the inverted pendulum type vehicle according to the present invention, it is not essential for the base body to tilt together with the payload supporting part for the occupant. For example, in the case where the vehicle includes a plurality of the traveling motion units, it is acceptable that the base body to which the traveling motion units are assembled is configured not to tilt with respect to the floor surface and the payload supporting is assembled to the base body freely tiltable with respect to the base body.

DESCRIPTION OF REFERENCE NUMERALS

1: inverted pendulum type omnidirectional vehicle; 3: seat (payload supporting part); 5: wheel assembly (traveling motion unit); 7: actuator; 9: base body.

What is claimed is:

1. An inverted pendulum type vehicle, comprising:
   a traveling motion unit capable of moving on a floor surface in all directions including a first direction and a second direction which are orthogonal to each other,
   an actuator for driving the traveling motion unit,
   a base body assembled with the traveling motion unit and the actuator, and
   a controller configured to control the actuator,
   wherein the controller is provided with a representative point velocity restrictor configured to restrict a travelling velocity of a predefined representative point of the vehicle according to a velocity permissible range and is configured to vary a velocity permissible range of a travelling velocity of the representative point in the second direction according to a travelling velocity of the representative point in the first direction.

2. The inverted pendulum type vehicle according to claim 1, wherein the first direction is a fore-and-aft direction of the vehicle and the second direction is a lateral direction of the vehicle.

3. The inverted pendulum type vehicle according to claim 1, wherein in an occupant velocity coordinate system where travelling velocity components toward a front side and a back side of the occupant, respectively, are represented by a positive coordinate value and a negative coordinate value of a first occupant velocity coordinate axis, respectively, and travelling velocity components toward a left direction and a right direction of the occupant are represented by a positive coordinate value and a negative coordinate value of a second occupant velocity coordinate axis, respectively, the velocity permissible range is defined in such a way that a maximum absolute value of positive coordinates in the first occupant velocity coordinate axis is greater than a maximum absolute value of negative coordinates in the first occupant velocity coordinate axis.

4. The inverted pendulum type vehicle according to claim 3, wherein the velocity permissible range is defined in such a way that a width thereof in a direction parallel to the second occupant velocity coordinate axis decreases continuously or discontinuously in a region of at least a part of coordinate values in the first occupant velocity coordinate axis as absolute values of the coordinate values in the first velocity coordinate axis increase.

5. The inverted pendulum type vehicle according to claim 3, wherein the velocity permissible range is defined to have a shape of a trapezoid in the positive side of the velocity coordinate system which has a lower bottom side overlapping with the second occupant velocity coordinate axis and a position of an upper bottom side represented by the positive coordinates of the first occupant velocity coordinate axis, and a trapezoid in the negative side of the velocity coordinate system which has a lower bottom side in common with the lower bottom side of the trapezoid in the positive side and a position of an upper bottom side represented by the negative coordinates of the first occupant velocity coordinate axis.

6. The inverted pendulum type vehicle according to claim 3, wherein the velocity permissible range is defined in such a way that a width thereof in a direction parallel to the second occupant velocity coordinate axis is a fixed value or decreases continuously or discontinuously in a region greater than a predefined value in the first occupant velocity coordinate axis as the absolute values of coordinate values in the first velocity coordinate axis increase, and meanwhile a width thereof in the direction parallel to the second occupant velocity coordinate axis is greater than the width at the predefined value in the first occupant velocity coordinate axis in a region smaller than the predefined value but greater than zero in the first occupant velocity coordinate axis.

7. The inverted pendulum type vehicle according to claim 3, wherein
   the controller is further provided with a detector for detecting a tilt of the base body,
   the representative point is a predefined point located above a ground contact point, and
   the travelling velocity of the representative point is determined according to a travelling velocity of the travelling motion unit and a detected tilt of the base body.

8. The inverted pendulum type vehicle according to claim 1, wherein in an occupant velocity coordinate system where velocity components of the vehicle toward a front side and a back side of the occupant, respectively, are represented by a positive coordinate value and a negative coordinate value of a first occupant velocity coordinate axis, respectively, and velocity components of the vehicle toward a left direction and a right direction of the occupant are represented by a positive coordinate value and a negative coordinate value of a second occupant velocity coordinate axis, respectively, the velocity permissible range is defined to have symmetry about the first occupant velocity coordinate axis.

9. The inverted pendulum type vehicle according to claim 1, wherein the velocity permissible range is defined to have symmetry about the first occupant velocity coordinate axis.

10. The inverted pendulum type vehicle according to claim 1, wherein the representative point velocity restrictor is provided with the velocity permissible range for the traveling velocity of the representative point and is configured to control the actuator to approximate an excess amount to zero if the traveling velocity of the representative point exceeds the velocity permissible range.

11. An inverted pendulum type vehicle, comprising:
   a traveling motion unit capable of moving on a floor surface in all directions including a first direction and a second direction which are orthogonal to each other,
   an actuator for driving the traveling motion unit,
   a base body assembled with the traveling motion unit and the actuator,
   a payload supporting part for boarding an occupant assembled to the base body, and
   a controller configured to control the actuator,
   wherein the controller controls the actuator to decrease a travelling velocity of a representative point in the second direction generated when the occupant moves a center of gravity thereof toward the second direction if an absolute value of a travelling velocity of the representative point in the first direction increases.

12. An inverted pendulum type vehicle, comprising:
a traveling motion unit capable of moving on a floor surface in all directions including a first direction and a second direction which are orthogonal to each other,
an actuator for driving the traveling motion unit,
a base body assembled with the traveling motion unit and the actuator, and
a controller configured to control the actuator,
wherein the controller controls the actuator to increase a ratio of a change in either a velocity or an acceleration of the travelling motion unit in the second direction with respect to a change in the travelling velocity of the representative point in the second direction if an absolute value of the travelling velocity of the representative point in the first direction increases.

* * * * *